(12) United States Patent
Bhandari et al.

(10) Patent No.: US 8,171,449 B2
(45) Date of Patent: *May 1, 2012

(54) GENERATING SEQUENCE DIAGRAMS USING CALL TREES

(75) Inventors: Kapil Bhandari, Bangalore (IN); Divya Bharti, Delhi (IN); Kallol Pal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 285 days.

This patent is subject to a terminal disclaimer.

(21) Appl. No.: 12/349,755

(22) Filed: Jan. 7, 2009

(65) Prior Publication Data

US 2009/0119650 A1    May 7, 2009

Related U.S. Application Data

(63) Continuation of application No. 10/937,083, filed on Sep. 9, 2004, now Pat. No. 7,506,320.

(51) Int. Cl.
*G06F 9/44* (2006.01)
(52) U.S. Cl. ......... 717/100; 717/133; 717/144; 717/157
(58) Field of Classification Search ............... 717/143, 717/100, 110, 133, 144, 157; 714/38
See application file for complete search history.

(56) References Cited

U.S. PATENT DOCUMENTS

| | | | |
|---|---|---|---|
| 5,452,449 A * | 9/1995 | Baldwin et al. ...................... 1/1 |
| 5,752,245 A | 5/1998 | Parrish et al. | |
| 5,963,739 A | 10/1999 | Homeier ........................ 395/704 |
| 6,002,872 A | 12/1999 | Alexander et al. | |
| 6,029,004 A | 2/2000 | Bortnikov et al. | |
| 6,182,281 B1 * | 1/2001 | Nackman et al. ............. 717/116 |
| 6,219,826 B1 | 4/2001 | De Pauw et al. | |
| 6,330,527 B1 | 12/2001 | Jung et al. ....................... 703/22 |
| 6,457,170 B1 | 9/2002 | Boehm et al. | |
| 6,557,011 B1 | 4/2003 | Sevitsky et al. ............. 707/104.1 |
| 6,594,783 B1 | 7/2003 | Dollin et al. .................... 714/38 |
| 6,651,243 B1 | 11/2003 | Berry et al. | |

(Continued)

FOREIGN PATENT DOCUMENTS

EP    0 801 346 A1    10/1997

(Continued)

OTHER PUBLICATIONS

Richner et al. "Using Dynamic Inforamtion for the Iterative Recovery of Collaborations and Roles", 2002, IEEE.*

(Continued)

*Primary Examiner* — Phillip Nguyen
(74) *Attorney, Agent, or Firm* — John A. Jordan

(57) ABSTRACT

A software tool is provided to analyze static source code. Source Code files are selected to define the project work space. A class and a method in the class are selected from said selected source code files. The tool generates a Call Tree as an ordered recursive sequence of all method calls in different classes or their instances that are invoked by said selected method in said selected class. A Sequence Diagram is generated from said Call Tree. The tool remembers all updates to the Call Tree used to generate the Sequence Diagram. This information is used when a generated Sequence Diagram is impacted due to changes made to any source code file included in the project.

15 Claims, 17 Drawing Sheets

U.S. PATENT DOCUMENTS

| | | | |
|---|---|---|---|
| 6,851,107 | B1 | 2/2005 | Coad et al. |
| 6,901,579 | B1 * | 5/2005 | Suguta ............... 717/108 |
| 6,996,516 | B1 * | 2/2006 | Kimura et al. ............ 703/22 |
| 7,055,130 | B2 * | 5/2006 | Charisius et al. ....... 717/108 |
| 7,167,870 | B2 | 1/2007 | Avvari et al. |
| 7,346,897 | B2 * | 3/2008 | Vargas ................ 717/137 |
| 7,392,514 | B2 * | 6/2008 | Edwards .............. 717/156 |
| 7,426,716 | B2 | 9/2008 | Kung et al. |
| 2003/0066055 | A1 | 4/2003 | Spivey |
| 2003/0088854 | A1 | 5/2003 | Wygodny et al. ....... 717/130 |
| 2003/0088860 | A1 * | 5/2003 | Wang .................. 717/153 |
| 2003/0212984 | A1 | 11/2003 | Miyazaki et al. ....... 717/116 |
| 2004/0010780 | A1 * | 1/2004 | Garvin ................ 717/143 |
| 2004/0031015 | A1 | 2/2004 | Ben-Romdhane et al. ... 717/107 |
| 2004/0264367 | A1 | 12/2004 | Edwards |
| 2005/0010899 | A1 | 1/2005 | Kung et al. |
| 2005/0204344 | A1 | 9/2005 | Shinomi |
| 2005/0273757 | A1 * | 12/2005 | Anderson ............. 717/100 |
| 2005/0278183 | A1 | 12/2005 | Ammons |

FOREIGN PATENT DOCUMENTS

| | | |
|---|---|---|
| JP | 06324967 A | 11/1994 |
| JP | 2007-287045 | 11/2007 |

OTHER PUBLICATIONS

Kern et al. "Effective Sequence Diagram Generation", 2003, Borland.*

Jacobs et al., "Interactive Visual Debugging with UML", ACM, 2003, pp. 115-122.*

Musial et al., "UML Assisted Visual Debugging for Distributed Systems", 2003.*

Liao et al., "A Reverse Engineering Portal Web Site", Nov. 2002.*

Rountev et al., "Control Flow Analysis for Reverse Engineering of Sequence Diagrams", 2004.*

Surendranath Ramasubbu, "Reverse Software Engineering Large Object Oriented Software Systems using the UML diagrams", 2000.*

Reverse Engineering of the Interaction Diagram from C++ Code by Paolo Tonella, et al. Publ. In IEEE Proc. of the Internat. Conf. on Software Maint. (ICSM'03) Sep. 22-26, 2003.

Notice of Allowance (Mail Date Oct. 31, 2008) for U.S. Appl. No. 10/937,083, Filing Date Sep. 9, 2004.

Notice of Allowance (Mail Date Nov. 9, 2011) for U.S. Appl. No. 12/100,564, Filing Date Apr. 10, 2008.

Notice of Allowance (Mail Date Nov. 2, 2011) for U.S. Appl. No. 12/105,658, Filing Date Apr. 18, 2008.

* cited by examiner

Base Model for Code Tree Analyzer

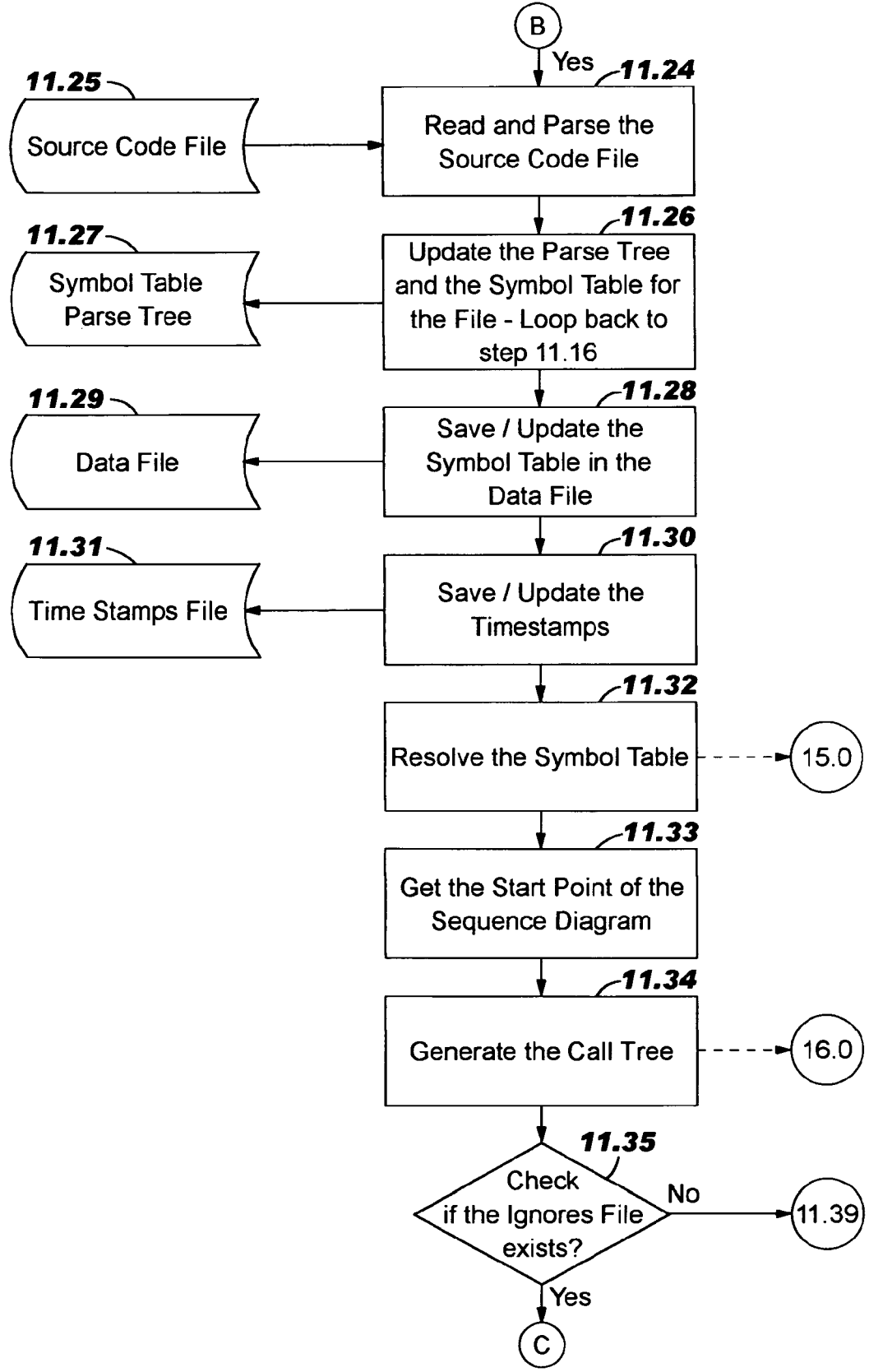

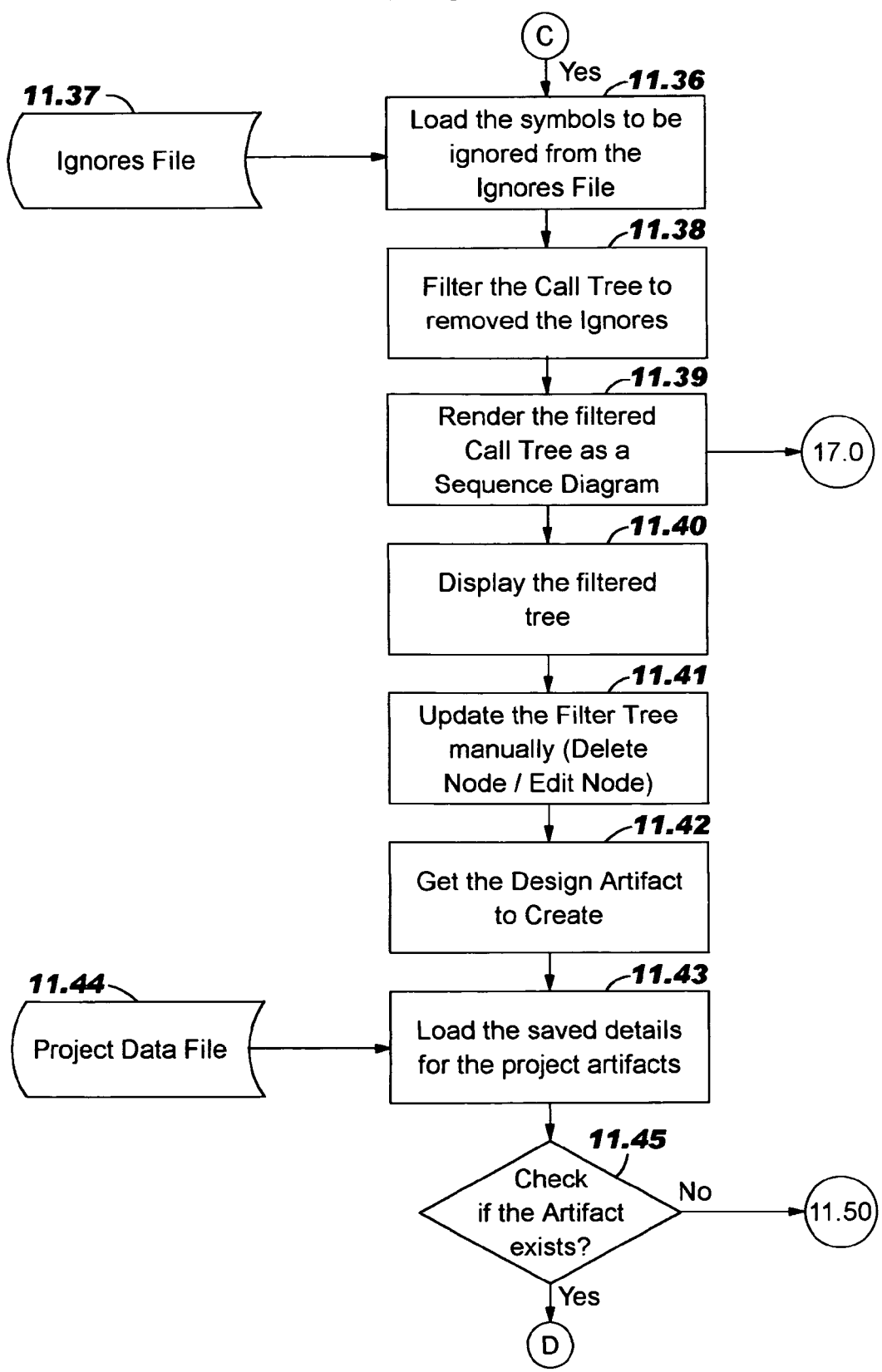

GENERATING SEQUENCE DIAGRAMS USING CALL TREES

The present application is a continuation application of a parent application Ser. No. 10/937,083 and filed Sep. 9, 2004 and allowed on Oct. 31, 2008 now U.S. Pat. No. 7,506,320.

BACKGROUND OF THE INVENTION

1. Field of the Invention

The present invention relates to a software analysis tool and, more particularly, to an integrated reverse engineering and design workproducts maintenance tool for object-oriented type programming languages, such as, Java, and the like.

2. Background and Related Art

A great variety of tools are available in the software industry to aid in developing, maintaining and updating software programs. One of the difficulties with maintaining and updating software is the ability to keep track of work products generated and determining the affected work products when a source code file that was used to generate the work products is modified. Various approaches have been used to provide tools to aid in analyzing and maintaining software and a number of these approaches are designed for object-oriented coding using sequence diagrams.

For example, the UML (Unified Modeling Language) uses sequence diagrams to capture interactions between software components, such as, objects, methods, modules, entire software applications, sub-systems, and the like. Programs, such as AQTime, employ a static profiler that does not run the application but creates a UML-style diagram that graphically represents the sequence of routine calls. Classes are shown as entities, and source-code calls between methods of different classes are treated as messages.

One of the difficulties with the AQTime tool resides in the fact that the tool is required to operate on the static executable compiled code with appropriate debug information. Since the AQTime tool operates on executable code, it has to rely entirely on the debug information in the executable files which information exists only at the level of classes.

On the other hand, tools, such as DYNO, draw sequence diagrams for a set of classes at runtime. DYNO instruments the classes for which the diagram needs to be drawn, such that, when the classes are run, the relevant data can be collected to draw the diagram. One of the difficulties with DYNO, then, is that it requires a runtime environment while working with files that need to be deployed on an application server or some such other software to be executed.

Although the use of sequence diagrams is key to work products that are used to capture the sequence of messages passed between different classes in typical applications, such use is generally limited to the low level design phase of the application development project. The reason for limiting to the low level design phase is that creating these diagrams for the first time in a project is usually not as difficult and involved as maintaining these diagrams in synch with the changes in code that happen during the later phases of a project.

Accordingly, known software analysis tools fail to provide a simple approach such as to operate directly on object oriented source code, in a reverse engineering manner, such as to identify the impacted work products when any of the source code files of an application program are modified. The ability to readily identify work products impacted by changes in some code files permits easy updating and maintenance of such products.

SUMMARY OF THE PRESENT INVENTION

In accordance with the present invention, a software tool is provided that allows for the creation of Sequence Diagrams directly from application source code. The Sequence Diagrams are used to analyze the effect of any updates and changes made to the source code file of the application program. The Sequence Diagrams are generated using call trees derived from the source code using the Code Tree Analyzer tool, in accordance with the present invention.

The Code Tree Analyzer tool operates within a defined project workspace of the application program. The project work space contains the complete paths of the source code files, such as Java source code files, that are to be analyzed to produce work products or design artifacts. Classes the user does want to include in the work products are identified in a list. The tool analyzes the source code and generates UML-compatible model files for the sequence and class diagrams, and text and rtf (rich text format) files containing the call tree. The tool remembers the work product data that have been created. This data is used later to determine the impacted products when any of the source code files in the application program are modified.

To determine impacted work products, the tool maintains a list of source code files. Each time a project is opened, this list is updated with the latest time stamps of the source code files. The tool maintains a list of work products that were created using the tool and the source code files that were used to create each work product. Once a project is opened, the tool compares the time stamps of the source code files that was saved in the previous run with the time stamps of the files in the latest run. A difference in time stamps is taken as an updated source code file. All work products that have used this source code file are marked as impacted. In addition, the impact to design artifacts that result from manual changes made to the source code files can be analyzed and updated using the tool. Thus, the Code Tree Analyzer tool provides an integrated reverse engineering and design work products maintenance arrangement for programming languages, such as, the Java Programming Language.

In accordance with an embodiment of the invention, a method is provided for analyzing source code of a computer program at static time using a machine, comprising:

selecting the source code to be analyzed;

selecting a class and method in the class based upon a selected class name in the source code to be analyzed;

generating a call tree as an ordered recursive sequence of all method calls in different classes or their instances that are invoked by the selected method in the selected class;

generating a sequence diagram from the call tree by presenting the method calls as messages in the same order in which they appear in the call tree; and storing the sequence diagram for use in maintaining the code.

In accordance with another embodiment, the above method wherein the time stamps of the source code are stored.

In accordance, with an embodiment of the invention, a method is provided for analyzing static source code of a computer program using a machine, comprising:

selecting source code for a class name and a method in the class as a start point to begin analyzing;

parsing said source code to determine method declarations, constructor declarations, variable declarations, method invocations and constructor invocations;

resolving all method and constructor declarations to determine return type of methods and their signatures;

resolving in order all method invocations having compound statements to determine data type of both variables on which the method invocations are invoked and implicit methods invoked on the methods;

determining classes corresponding to the variables and the implicit methods;

resolving the order in which the methods are invoked; and generating a sequence diagram from a call tree using the order in which the methods are invoked.

In accordance with a further embodiment, the above method wherein classes related to a class used as a start point are arranged around the class used as a start point in radial fashion as a class diagram.

In accordance with another embodiment, wherein the above method includes the steps of generating a plurality of different call trees by using respective source code for different class names and different methods in the class as a start point and storing the data structure of each of said plurality of different call trees.

BRIEF DESCRIPTION OF THE DRAWING

FIGS. 4A-4E is a flow chart illustrating the main process of the Code Tree Analyzer tool, in accordance with the present invention.

DETAILED DESCRIPTION

In the following description of the preferred embodiment, reference is made to the accompanying drawings which form a part hereof, and in which is shown by way of illustration a specific embodiment in which the application may be practiced. It is to be understood that other embodiments may be utilized and changes may be made without departing from the scope of the invention.

Figure 1:
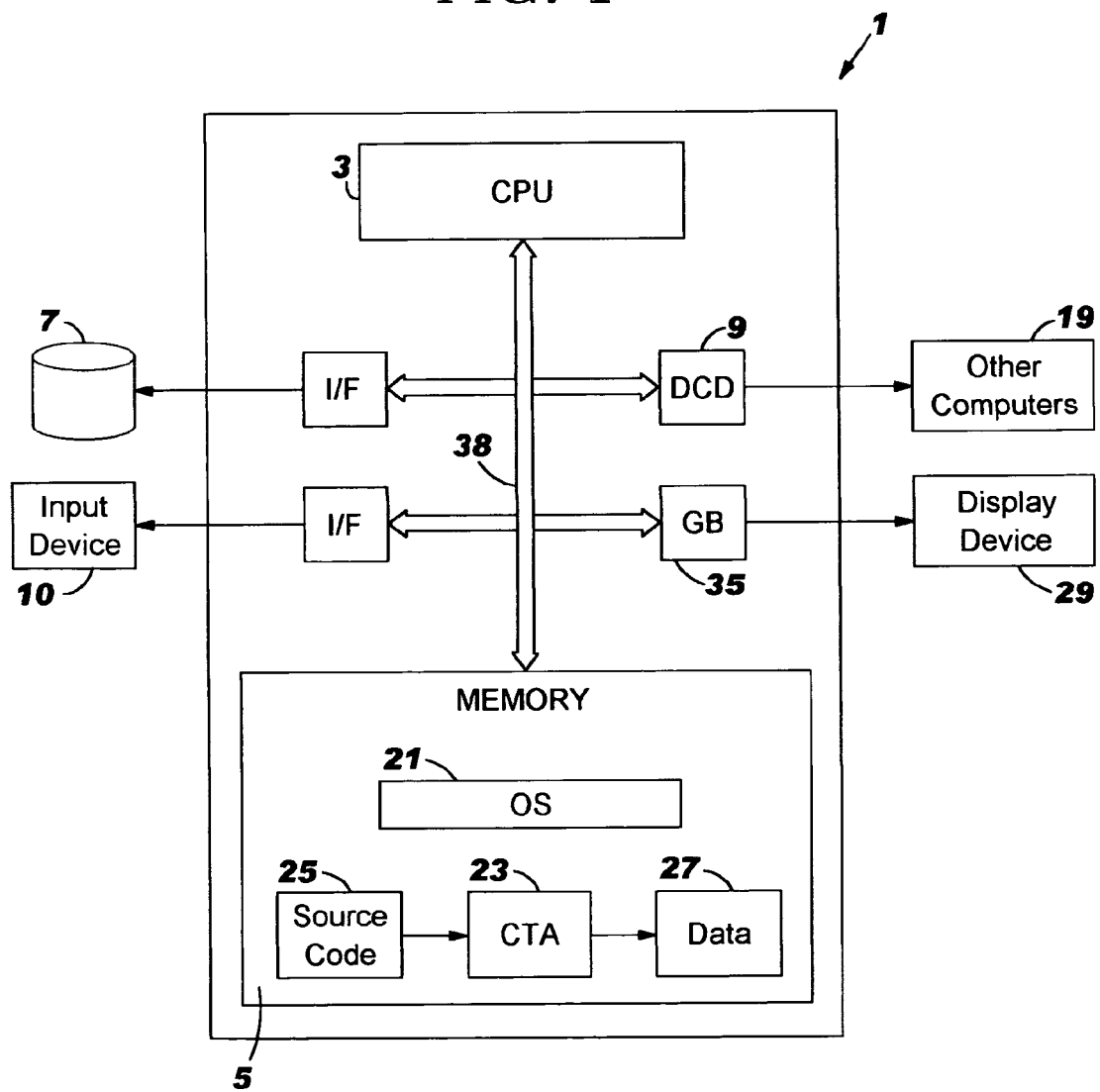
FIG. 1 shows a block diagram illustrating an exemplary hardware environment which may be used to carry out the preferred embodiment of the invention.

FIG. 1 is a block diagram illustrating an exemplary hardware environment used to implement the preferred embodiment of the invention. In this exemplary hardware environment, a computer system arrangement 1 may include a central processing unit (CPU) 3, memory 5, data storage device 7, data communications device (DCD) 9, input device 10 and display device 29. Other peripheral devices may also be included. The input device and storage device are connected to the system bus 31 through respective interface units I/F while the display device is connected to the system bus through graphics board 35. The computer system 1 may be connected locally or remotely to fixed and/or removable data storage devices, such as, storage device 7. The computer system 1 may also be connected to other computer systems 19 through DCD 9.

The present invention may be implemented using one or more computer programs that form the Code Tree Analyzer tool, which tool executes under control of the operating system (OS) 21, such as, Windows, DOS, OS/2, AIX, UNIX, MVS, etc. The stored Code Tree Analyzer tool (CTA), as represented by block 23, causes the computer system 1 to operate on stored static application source code files, as represented by block 25. The resulting work products are stored as data, shown by block 27. Thus, in accordance with the present specification, the invention may be implemented as a machine process or article of manufacture by using standard programming and/or engineering techniques to produce software, firmware, hardware or any combination thereof.

The Code Tree Analyzer, as represented by block 23, and operating system 21 are tangibly embodied or readable from a computer-readable device or media, such as memory 5, data storage device 7 and/or data communications device 9, thereby making a computer program product or article of manufacture, according to the invention. As such the term "article of manufacture" and "computer program product" as used herein are intended to encompass a computer program accessible from any computer readable device or media.

Code Tree Analyzer 25 and operating system 21 both include instructions which, when read and executed by the computer system 1, cause the computer system to perform steps to process and analyze application source code 25, in accordance with the invention. Under control of the operating system, the Code Tree Analyzer code may be loaded from any of a variety of sources into memory 5. Source code 25 to be analyzed will be described in terms of the Java programming language although, it is clear that with minor modifications, other object-oriented programming languages may also be analyzed.

In accordance with the present invention, the Code Tree Analyzer tool is built around Sequence Diagrams as a visual representation of Call Tree data structures. The Call Tree data structure is a tree structure that is created by recursively determining method calls on classes or their instances starting at a specified method in a class (as input). The following example demonstrates the process used to generate a Call Tree from Java source code in the Code Tree Analyzer tool. Although the example and the discussion is in terms of the Java programming language, it is clear that the process described is not restricted to the Java programming language and could readily be applied to other programming languages as well.

The purpose of determining the Call Tree is to form a data structure to use to derive a Sequence Diagram. The Sequence Diagram begins with a method invocation on a class. In the context of the Code Tree Analyzer tool, this has been called the "start point". A start point is a class name and method name combination from where the tool starts creating the Sequence Diagram. This is taken as one of the inputs from the user in the Code Tree Analyzer tool.

The following three Java code snippets are used as a simple example to demonstrate the process of forming a Call Tree and Sequence Diagram. Each line of the code snippets has been numbered for reference in the description.

Code Snippet 1: ClassA

```
1    public class ClassA {
2
3         /*The constructor for Class A */
4         public ClassA ( ) {
5
6         }
7
8         /*A method in class A */
9         public void method1A(String arg1) {
10
11            /* Class A creates a new instance of Class B */
12            ClassB instClassB = new ClassB( );
13
14            /* Class A invokes a method on Class B */
15            instClassB.method1B( );
16
17            /* Class A creates a new instance of Class C */
18            ClassC instClassC = new ClassC( );
19
20            /*Class A invokes a method on class C */
21            instClassC.method2C( );
22        }
23
24        /* Another method in class A */
25        public void method2A( ) {
26
27        }
28   }
```

Code Snippet 2: ClassB

```
1    public class ClassB {
2
3         /*The constructor for Class B */
4         public ClassB ( ) {
5
6         }
7
8         /*A method in class B */
9         public void method1B( ) {
10
11            /* Class B invokes a method on itself */
12            method2B( );
13
14            /* Class B invoked another method on itself */
15            method3B( );
16        }
17
18        /*The method 2B */
19        public void method2B( ) {
20
21        }
22
23        /* The method 3B */
24        public void method3B( ) {
25
26            /* Class B Creates an instance of classC */
27            ClassC instClassC = new ClassC( );
28
29            /*Invoke a method on class C */
30            nstClassC.method1C( );
31        }
32   }
```

Code Snippet 3: ClassC

```
1    public class ClassC {
2
3         /*The constructor for Class C */
4         public ClassC ( ) {
5
6         }
7
8         /*A method in class C */
9         public void method1C( ) {
10
11        }
12
13        /*The method 2C */
14        public void method2C( ) {
15
16        }
17
18        /*The method 3C */
19        public void method3C( ) {
20
21        }
22   }
```

The above code snippets show the source code for three Java classes. Assuming that the user wants to draw a sequence diagram beginning at the start point ClassA—method1A, the Call Tree would be derived as follows:

First determine the declaration for method1A in the class ClassA. Method method1A starts at line 9 and ends at line 22 in the code snippet 1. In the method method1A determine the methods and constructors that are invoked. In this case, the following methods and constructors are invoked.

1. The constructor of ClassB at line 12
    2. The method method1B on class ClassB at line 15
    3. The constructor of ClassC at line 18
    4. The method method2C on class ClassC at line 21

The above represents the first iteration of the tool.

For each of the above, determine the declarations. In so doing, the following is determined.

1. The constructor ClassB starts at line 4 and ends at line 6 in Code Snippet 2
    2. The method method1B of class ClassB starts at line 9 and ends at line 16 in Code Snippet 2
    3. The constructor ClassC starts at line 4 and ends at line 6 in Code Snippet 3
    4. The method method2C of the class ClassC starts at line 14 and ends at line 16 in Code Snippet 2

For each of the above method and constructor invocations, determine the methods and constructors invoked in them.

1. There are no methods or constructors invoked within the Constructor ClassB
    2. Following are the methods and constructors invoked within the method method1B of the ClassB
    2.1 The method method2B on class ClassB at line 12
    2.2 The method method3B on class ClassB at line 15
    3. There are no methods or constructors invoked within the Constructor ClassC
    4. There are no methods or constructors invoked within the method method2C of ClassC The above represents the second iteration of the tool.

For the items 2.1 and 2.2 above determine the declarations. In so doing the following is determined. The other items are ignored in this iteration, as they do not have any method or constructor invocations in them.

2.1 The method method2B of class ClassB starts at line 19 and ends at line 21 in Code Snippet 2.

2.2 The method method3B of the class ClassB starts at line 24 and ends at line 31 in Code Snippet 2.

For each of the above method and constructor invocations (2.1 & 2.2), determine the methods and constructors invoked in them.

2.1 There are no methods or constructors invoked within the method method2B of the class ClassB 2.2 Following are the methods and constructors invoked within the method method3B of the ClassB 2.2.1 The constructor of ClassC at line 27

2.2.2 The method method1C on class ClassC at line 30

The above represents the third iteration of the tool.

For the item 2.2.1 and 2.2.2 above determine the declarations. In so doing, the following is determined. The other item (2.1) is ignored in this iteration, as it does not have any method or constructor invocations in it.

2.2.1 The constructor ClassC starts at line 4 and ends at line 6 in Code Snippet 3

2.2.2 The method method1C of the class ClassC starts at line 9 ad ends at line 11 in Code Snippet 3.

For each of the above method and constructor invocations (2.2.1 & 2.2.2), determine the methods and constructors invoked in them.

2.2.1 There are no methods or constructors invoked within the constructor ClassC 2.2.2 There are no methods or constructors invoked within the method method1C of the class ClassC This ends the process, since in both of the above items no further methods or constructors are invoked. The Call Tree is derived by putting together the method invocations derived above in the three iterations in the recursive order in which they are invoked. For the above example, the Call Tree for the specified start point would look like the following.

0. ClassA—Method: method1A (The specified start point)
1. ClassB—Constructor: Class B (New instance of ClassB—instClassB1)
2. ClassB—Method: method1B (invoked on instClassB1)
    2.1 ClassB—Method: method2B (invoked on instClassB1)
    2.2 ClassB—Method: method3B (invoked on instClassB1)
        2.2.1 ClassC—Constructor: ClassC (new instance ClassC—instClassC2)
        2.2.2 ClassC—Method: method1C (invoked on instClassC2)
3. ClassC—Constructor: ClassC (New instance of ClassC—instClassC1)
4. ClassC—Method: method2C (invoked on instClassC1)

Figure 2:
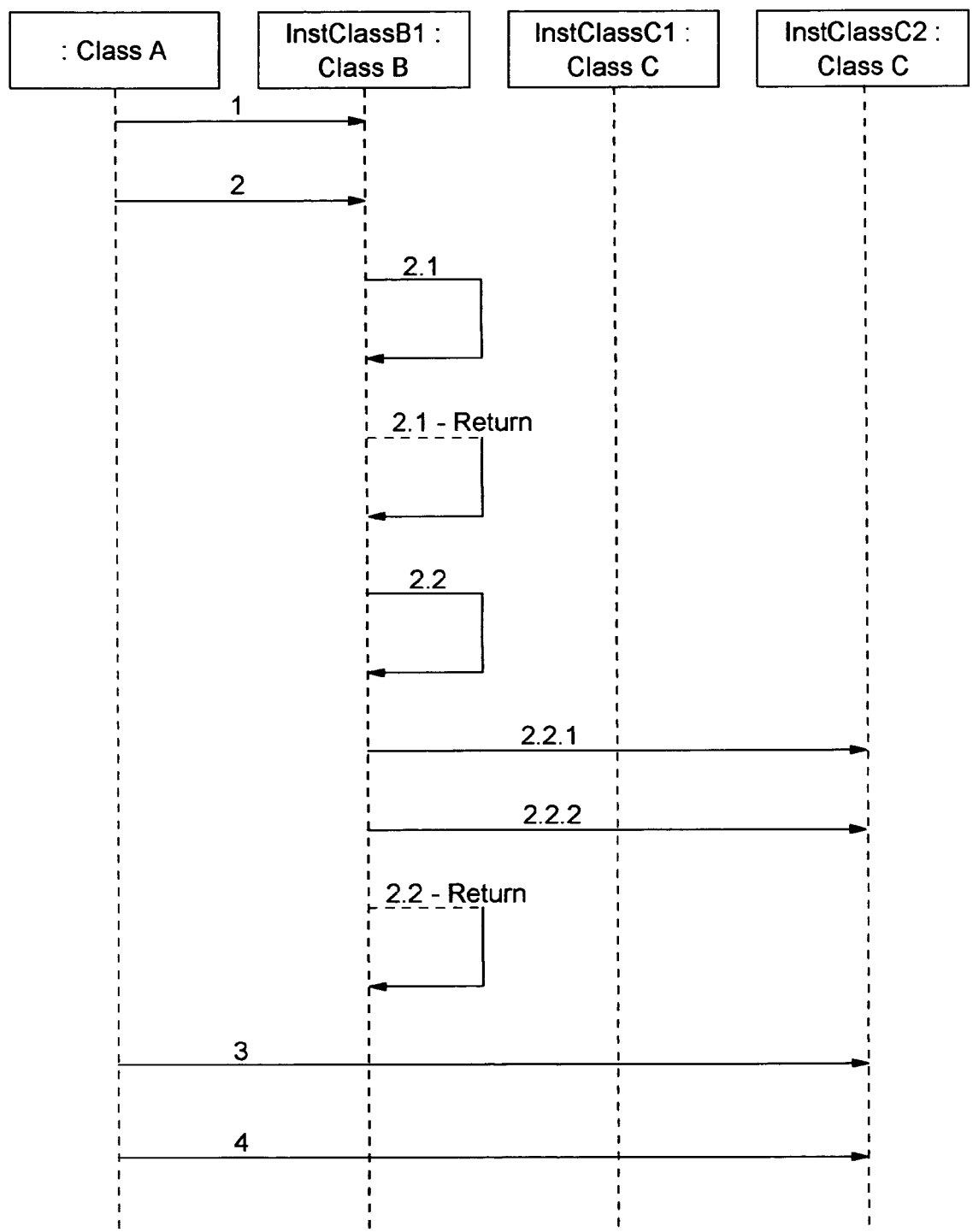
FIG. 2 shows a Sequence Diagram derived from a Java code snippet example used to show the manner of forming a Call Tree.

New instances of classes are created at steps 1, 2.2.1 and 3. Each of these may be represented using a different icon in the Sequence Diagram. FIG. 2 shows a Sequence Diagram for the above code snippet examples with the instances of classes represented across the top of the figure and message lines connecting the instances. This information and other related information like line numbers, etc. are stored by the tool in a tree data structure.

Thus, as defined herein, a Call Tree is an ordered recursive sequence of all methods in different classes that are invoked given a method in a class as the starting point. The Call Tree or a valid sub-tree is representative of the Sequence Diagram. This concept is used in the Code Tree Analyzer tool of the present invention.

Before describing the details of the flow charts, a general description of the use and operation of the Code Tree Analyzer tool will be provided. The first step in using the Code Tree Analyzer tool is defining a project workspace. At the minimum, a project workspace contains the complete paths of the Java source code files that are to be analyzed to create the design artifacts. In addition to the paths, the project workspace includes a list called "Ignores". Ignores is a list of class names that will be ignored while creating the different design work products. Ignores are used to filter out those classes that the user does not wish to include in the design artifacts generated by the tool.

Design artifacts are the different work products that are created using the tool. The tool creates UML-compatible model files for the Sequence and Class Diagrams and text and rtf files containing the call tree. The tool also stores data on the work products that have been created. As previously described, this data is later used to determine the impacted work products when any of the source code files in the project is modified.

To begin analyzing the Java source files in the project, it is first necessary to select a start point. Again, a start point is a combination of a class name and a method in the class. This is used by the tool to create a Call Tree beginning at the selected start point. Additionally, while analyzing the source files, the tool also determines the relationships between the classes. These relationships are used to generate the Class Diagrams.

The Call Tree that is generated based on the specified start point is used to create a Sequence Diagram that is displayed in the tool. The depth of the Call Tree (and hence the Sequence Diagram) can be controlled by selectively including and excluding Java source code files in the project. If a call is made into a class for which the source code file has not been included in the project, the corresponding path in the Call Tree stops there. The tool, however, also displays those classes that are not in the project but whose methods have been invoked along a Call Tree path. Such classes occur only as leaf nodes in the Call Tree.

The tool includes the feature of providing the ability to update a Sequence Diagram by deleting icons, deleting messages or updating existing messages. The Sequence Diagram can then be saved in UML-compatible format. The tool remembers all the manual updates to the Call Tree that was used to generate the Sequence Diagram. This data is later used to reapply the manual updates to the Call Tree when the generated diagram is impacted due to changes made to any source file included in the project.

The tool also provides features that allow the user to save the Call Tree in either text or rtf format. The text format is a detailed version that also includes the line numbers in the source files where the various methods have been invoked. This may be used to determine the complete call tree for a method during debugging. The rtf format is a summary version where calls made by only the method specified in the start point are included.

The default Class Diagram is generated using the class specified in the start point as the center of the universe. Only relationships of this class with the other classes are displayed. This allows for optionally including other relations using features provided by the tool. Displayed relations can also be selectively hidden. The UML-compatible model files are generated based on the currently displayed diagrams.

The tool stores the time stamps for the Java source files in the project to determine if any source file included in the project has changed. Later, when a project is re-opened, the tool compares the latest time stamps of the source code files with the stored timestamps. A mismatch of time stamps is taken as an updated file.

If the tool finds a source file that has been changed, it is able to search through the work products that were previously generated to find out how many of these are impacted and hence need to be updated. The user is prompted to update these work products. All manual updates that were previously made by the user on the design artifacts can be replayed manually on the newer versions.

The tool also has a built in differencing algorithm that is capable of determining the extent of change between the original design artifacts and the new ones. The differencing algorithm is applied to the Call Trees used to generate the design artifacts. In many cases the design artifacts can be updated without any manual intervention. The tool is capable of applying the manual updates made to the original call tree to the new one.

Additionally, the tool may operate to generate basic code metrics for the analyzed files. They may include, for example, the physical number of lines, the number of shipped source instructions, total number of lines containing comments, code to comment ration, etc. This feature may also be used, for example, to quickly analyze code and verify it against coding guidelines.

The tool first parses the Java source files to determine the Variable Declarations, Method Declarations, Constructor Declarations, Method Invocations and Constructor Invocations. The tool then resolves all the variables to determine their data types. This includes resolving the return types for invoked methods to determine the signature of other methods that use these return values as arguments. The tool also resolves method signatures. Then, the method invocation order is resolved for compound statements. This is a preliminary step to developing the Sequence Diagram. The tool then generates a Call Tree based upon the selected start point. The Call Tree is then used to generate a Sequence Diagram. This is simply done by drawing the method calls as messages in the Sequence Diagrams in the same order in which they appear in the Call Tree.

Figure 3:
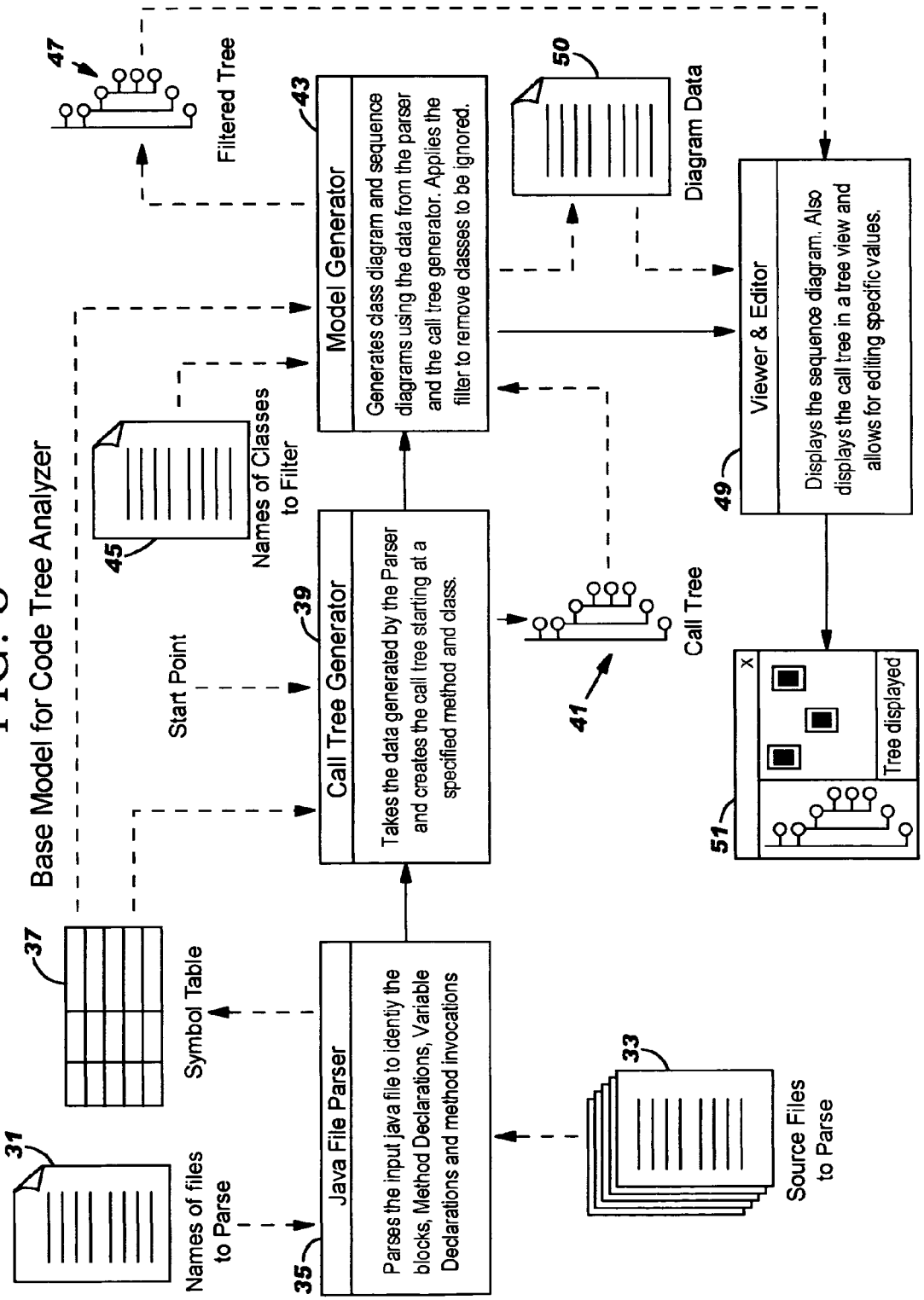
FIG. 3 is a flow chart diagram representing the flow process of the base model of the Code Tree Analyzer tool, in accordance with the present invention.

FIG. 3 shows the basic model for the Code Tree Analyzer tool. The Names of files 31 and Source files 33 of the Java application program to be parsed are parsed by Java File Parser 35 to identify the blocks defining Method Declarations, Variable Declarations, Method Invocations and Constructor Invocations. The symbols (the method names, constructor names and variable names) occurring in each of the identified blocks are stored in a Symbol Table. Call Tree Generator 39 takes the Symbol Table formed by Parser 33 and creates a Call Tree starting at the user specified method and class. An example Call Tree is shown at 41.

The output from the Call Tree Generator is fed to Model Generator 43. Model Generator 43 generates the Class Diagram and Sequence Diagram. The Ignores, i.e., the Names of Classes 45 to be filtered out of these Diagrams are also fed to Model Generator 43 so that the resulting design artifacts generated by the tool is a function of both the specified method and class starting point and the specified class names to be filtered out. An example of a Filtered Tree is shown at 47. Diagram Data 50 represents an intermediate data store that contains graphic data on the Sequence Diagrams and Class Diagrams. This graphic data is used by Viewer & Editor 49 to render these Diagrams. As shown, the Sequence Diagram is displayed by Viewer & Editor 49. The Call Tree, in a tree view, is also displayed in a manner to allow for editing specific values. A displayed example is shown at screen 51.

FIGS. 4A-E show flow charts representing the main process flow of the Code Tree Analyzer tool. The Node 11.0 represents the Start Point for the Main Flow. The Main Flow may be split into the following main steps:
  Creation and maintenance of projects
  Analysis of the source code files to create the Call Trees and symbol tables
  Rendering the Call Trees as a Sequence Diagrams
  Using the Symbol tables to create Class Diagrams
  Generating design artifacts
  Analyzing impacts to previously generated design artifacts and updating them The first step in starting the process, is get the Project Name, identified as step 11.1. The Project may be an existing project or a new one to be created by the tool. Each project is identified by a unique name and consists of an Inputs File, Data File, Time Stamps File, Ignores File and Project Data File.

The Inputs File stores the complete paths of the source code files that are to be analyzed as part of this project. The Data File stores the unresolved symbol table for the analyzed files. The intent of storing this data is to optimize the time spent on analyzing the source files if the project is re-opened at a later time. During later runs of the tool for the same project, the tool only analyzes those files that have been modified since the previous run of the tool. This helps save time as analyzing files for a large project with many files takes time.

The Times Stamps File stores the timestamps for the source code files. This data is used in later runs of the tool for the same project to determine the source code files that have changed. The Ignores File stores a list of class names that have to be ignored while creating the sequence diagram, class diagram or any other design artifact. This file allows the user to selectively filter out classes that he is not interested in displaying in the diagrams. For example, the user may choose to filter out all the standard Java classes to avoid making the sequence diagrams unmanageable. The Project Data File stores details about the design artifacts created using the tool. This data is used in the later runs of the tool for the same project to determine the impacted work products due to changes made to source code files.

In addition to the above, the tool maintains a Master File that contains the details of all the projects created using the tool. This file stores the project names and the complete paths of the above files for each project. Thus, if a project does not exist in the Master File, a new Project is created, as shown at step 11.3 and in FIG. 5.

At the time of creating a project, the user specifies the source code files to be included therein and the symbols to be ignored. The Inputs File and the Ignores File are created as soon as a new project is created. However, the timestamps file, data file and project data file are created at a later time. The master file is only updated with the complete paths for these files at the time of project creation.

If the Project already exists in the Master File, the Project file names are retrieved from Master File 11.4. The tool at this point gets the full paths of the Inputs File, Data File, Time Stamps File, Ignores File and the Project Data File. Next, it is determined whether a Timestamps file exists for the Project file names.

When a new project is created, none of the associated files for the project would exist even though the paths for these files would have been specified in the Master file at the time of project creation. If a Timestamps file does not exist, one is created, as shown at step 11.7 and in FIG. 6. If a Timestamps file does exist, the tool loads the Timestamps for the source code files into the process, as shown at step 11.8. These are the Timestamps for the source code files that were saved from the previous run of the tool for the same project.

Next, a check is made to determine if a Data file exists, as shown by step 11.10. If a Data file exists, the Symbol Table for the previous run of the tool for the same project from the Data File is loaded into the process. In this run of the tool, only those source code files that have been updated would be re-analyzed. The tool compares the current time stamps of the source code files with those saved from the previous run of the tool (in the time stamps file) to determine the updated files. Storing the symbol table from the previous run of the tool for a project and reloading it at the next run helps save time in reanalyzing all the source code files.

The node 11.13 in the flow chart represents the Data file. This is a binary file which, in the current implementation for Java, uses standard Java object serialization techniques to save the symbol table data structures directly. If a Data files does not exist, one is created, as shown by step 11.11.

Figure 4A:
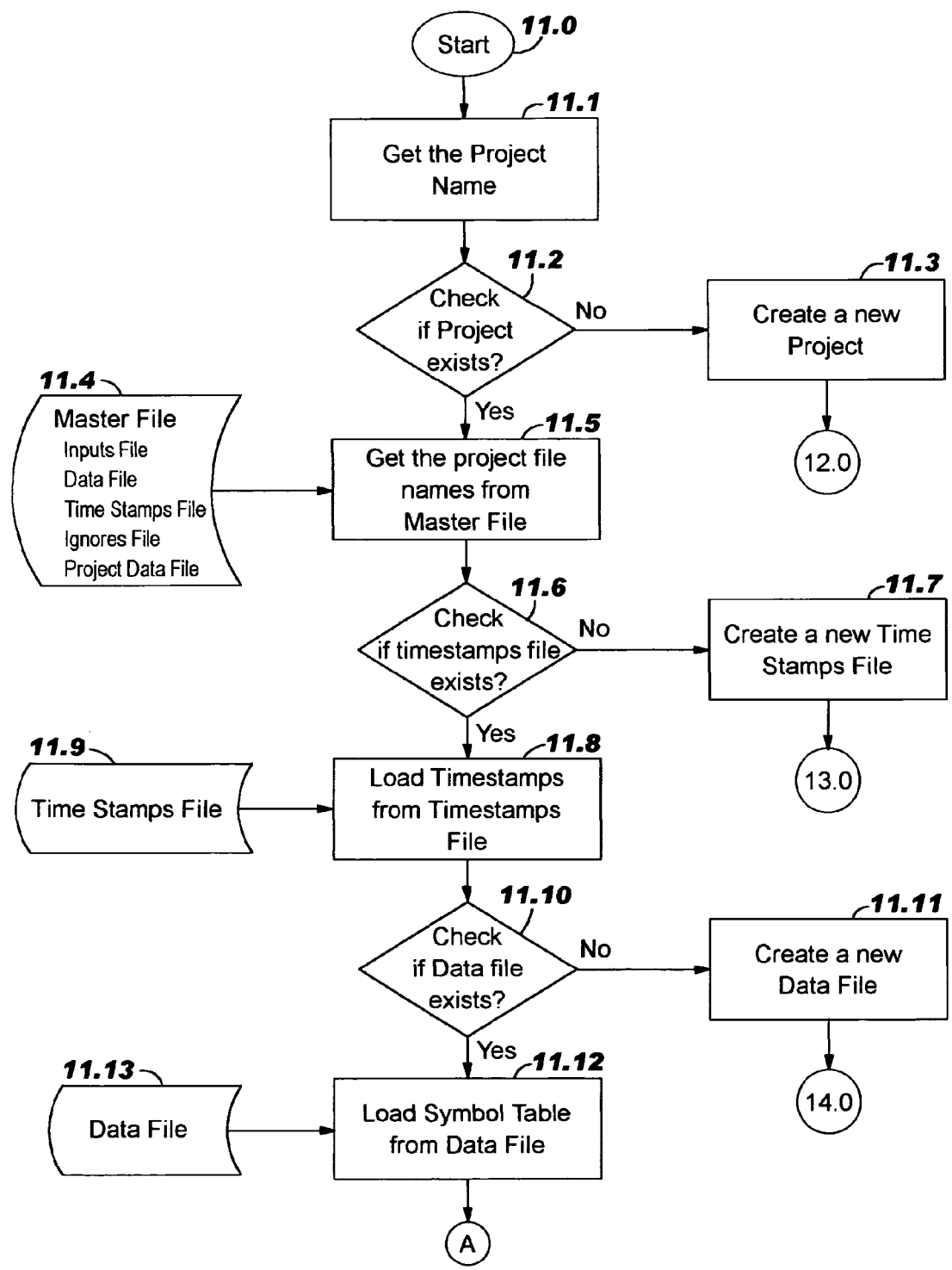
Figure 4B:
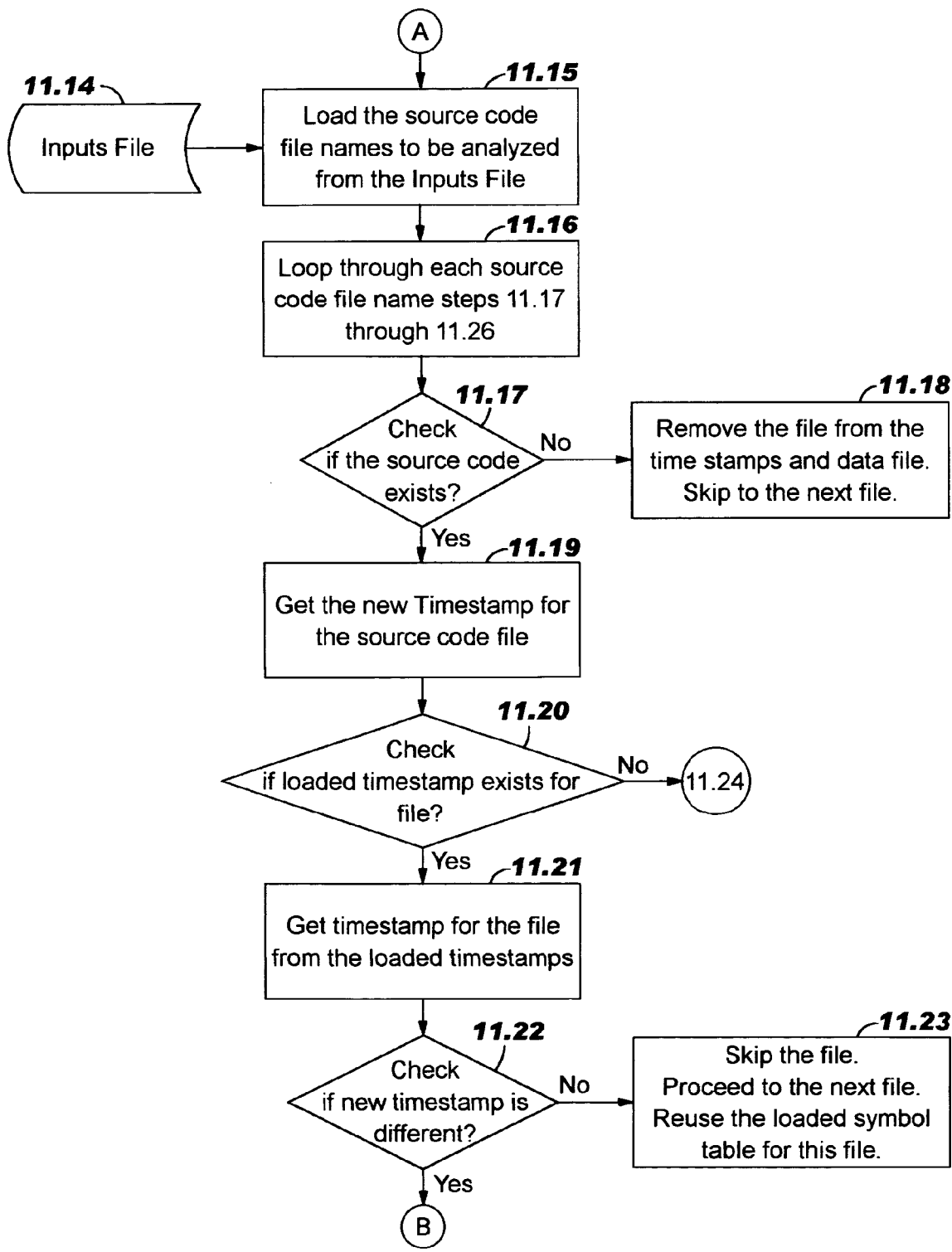

The Source Code File Names to be analyzed from the Inputs File are then loaded into the process, as shown by step 11.15 in FIG. 4B. The tool loads the complete paths of the source code files that need to be analyzed as part of the project from the Inputs File for the Project. The Inputs File is created when a new project is defined.

After loading in the Source Code File Names, each source code file name is looped through steps 11.17 to 11.26, as shown in FIG. 3B. In doing this, it is first determined whether a source code file exists for the first source code file name. If not, it is removed from the Timestamps and Data File as shown at step 11.18 and the process goes to the next file name. If the file does exist for the source code file name, a new time stamp is obtained for the source code file and a determination is made at step 11.20 if a loaded timestamp already exists for the file. If not, the Source Code File is read and parsed, as shown by step 11.24 in FIG. 4C. If a loaded timestamp already exists for the file, it is retrieved and compared to the new time stamp, as shown by step 11.22. If the time stamps are different, the Source Code File is read and parsed, as shown by step 11.24 in FIG. 4C. If the time stamps are not different, the file is skipped and the process loops back to the next file.

After reading and parsing the source code files in step 11.24 in FIG. 4C, the Parse Tree and Symbol Table data structures for the source Code File are updated in step 11.26 and the process loops back to step 11.16 in FIG. 4B.

In this regard, it should be understood that the Symbol Table is a collection of data nodes where each node may contain the following details.

- Symbol Name—This is the name of the symbol. Could be set to a method, variable or constructor name.
- Symbol Type—This is the type of the symbol. Could be set to any one of method declaration, constructor declaration, variable declaration, method invocation or constructor invocation.
- Method Signature—This is the resolved signature of the method or constructor. This value is set for all the types but for variable declaration.
- Original Method Signature—This is the original unresolved signature of the method or constructor. This value is set for all the types but for variable declaration.
- Data Type—The data type of a variable or the variable on which a method is invoked.
- Return Type—The data type of the return value for a method.
- Block Number—The code block in which the symbol was found.
- Block Hierarchy—The hierarchy of blocks (nested blocks) where the last block is the block number in which the symbol was found.
- Line Number—The line number in the source code file where the symbol was found.

The parse tree maintains the block hierarchy for the source code files analyzed. It also maintains other attributes of the class in the source code file. For example in the case of Java, this may include the super classes, the interfaces implemented by the class, the package, etc.

Figure 8:
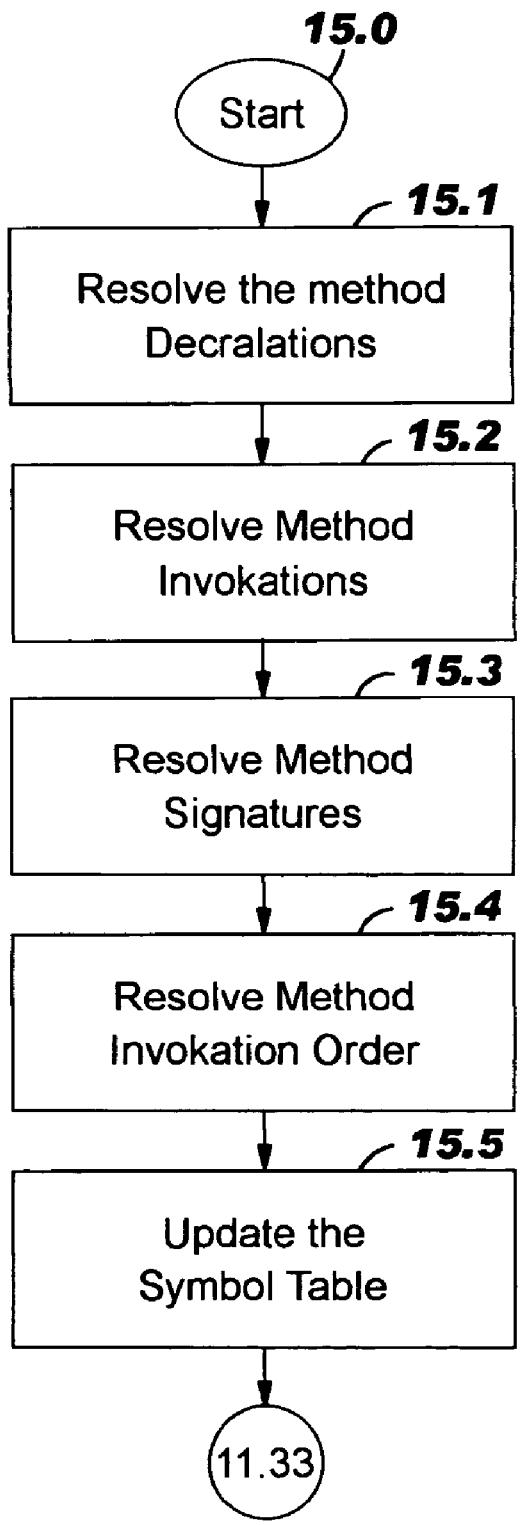
FIG. 8 is a flow chart illustrating a process that acts to resolve the symbol table, as identified in FIGS. 4A-4E.

After completing the loops, the next steps are to Save/Update the Symbol Table in the Data File and save/Update the Timestamps File, as shown by steps 11.28 and 11.30 in FIG. 4C. The Symbol Table is the Resolved in step 11.32 and the Start Point of the Sequence Diagram is retrieved in step 11.33. The details of the Symbol Table Resolve step are shown in FIG. 8.

Figure 9:
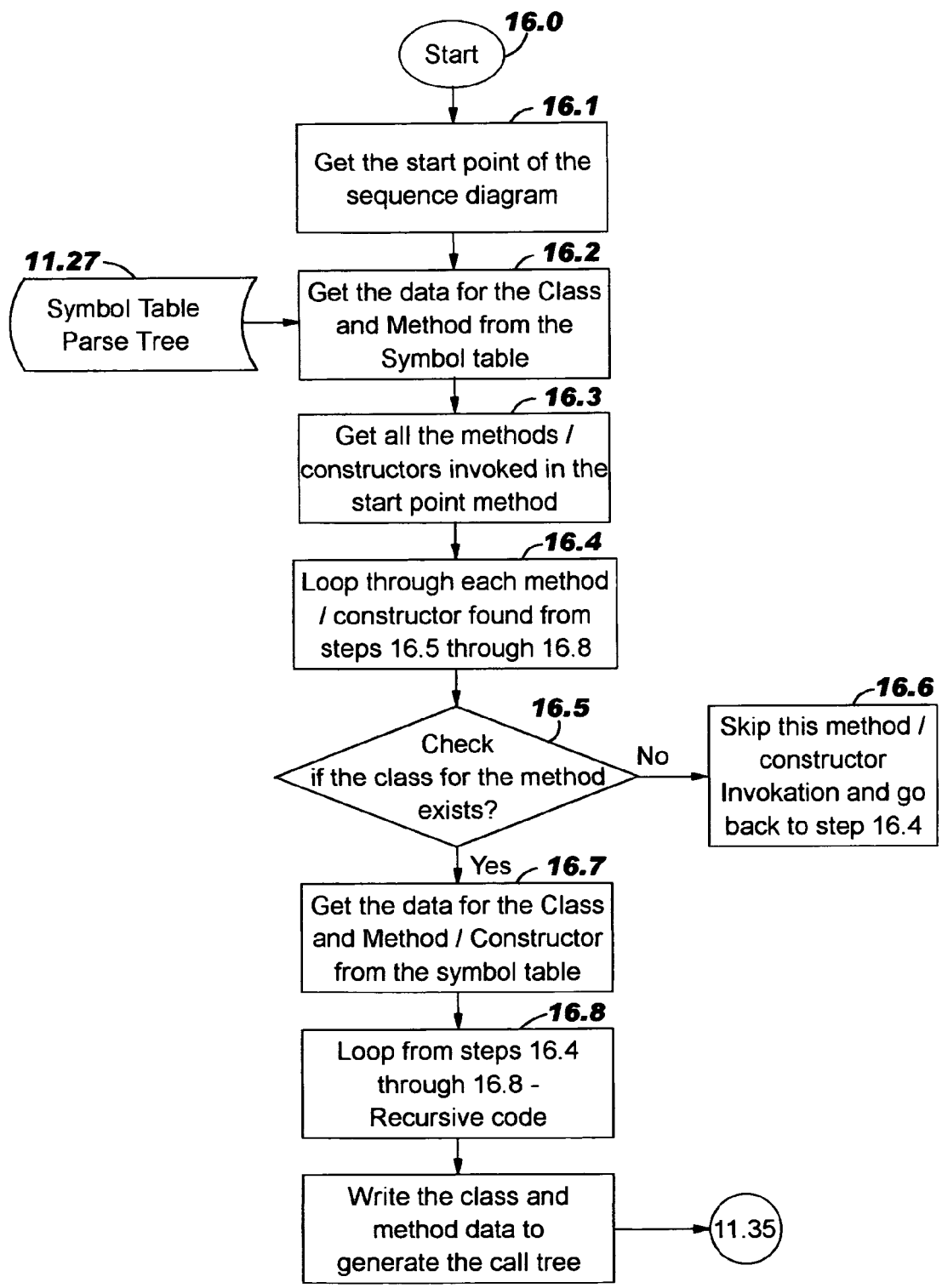
FIG. 9 is a flow chart illustrating a process for generating a Call Tree, as identified in FIGS. 4A-4E.

After retrieving the Start Point, the Call Tree is generated in step 11.34, the details of which are shown in FIG. 9. Then a determination is made of whether an Ignores File exists and if it does not, the process moves forward to step 11.39 in FIG. 4D wherein a filtered Call Tree as a Sequence Diagram is rendered. In this regard, the Ignores File is a text file that contains a list of class names, one class per line, that needs to be ignored in creating a design artifact.

If an Ignores File does exist, the symbols corresponding to the classes to be ignored are loaded into the process, as shown by step 11.36 in FIG. 4D. After loading the symbols to be ignored into the process, the Call Tree is filtered to remove ignores and the filtered Call Tree as a Sequence Diagram is rendered and displayed, as shown by steps 11.39 and 11.40.

The Filtered Call Tree is allowed to be manually updated in Step 11.41. The user may delete a node from a tree or edit contents of a node. The manually updated filtered Call Tree is used to create all of the design artifacts. The tool records the manual updates and saves them as part of the Project Data. The tool then takes as input, the design artifact to be created. This input may include.

- A Sequence Diagram saved in UML-compatible format
- A Class Diagram saved in UML-compatible format
- The filtered Call Tree saved in RFT format as a sequence of steps
- The unfiltered Call Tree save in Text format as a sequence of steps The tool then loads the saved details for the project artifacts from the previous run of the tool for the Project, if data exists in the Project Data File. This is shown at step 11.43 in FIG. 4D. Node 11.44 represents the Project Data File. This may be a binary file that stores the following.

- Complete paths of the design artifact files generated using the tool.
- The filtered Call Tree that was used to create each artifact.
- The manual updates made by the user to the each filtered call tree.
- The classes that are referenced in the artifact.

In step 11.45 of FIG. 4D, the tool checks if the artifact specified by the user exists in the Project Data. If the artifact does not exist in the project data file, it creates the project artifact. If the project artifact exists in the Project Data, the tool compares the current data for the artifact with the previous data loaded from the Project Data file, as shown in step 11.46 in FIG. 4E. The tool then displays the differences, if any between the current version of the artifact and its previous version, as shown by step 11.47 in FIG. 4E. The tool also displays the manual updates, if any, made to the filtered call tree in the previous version of the artifact.

Figure 4E:
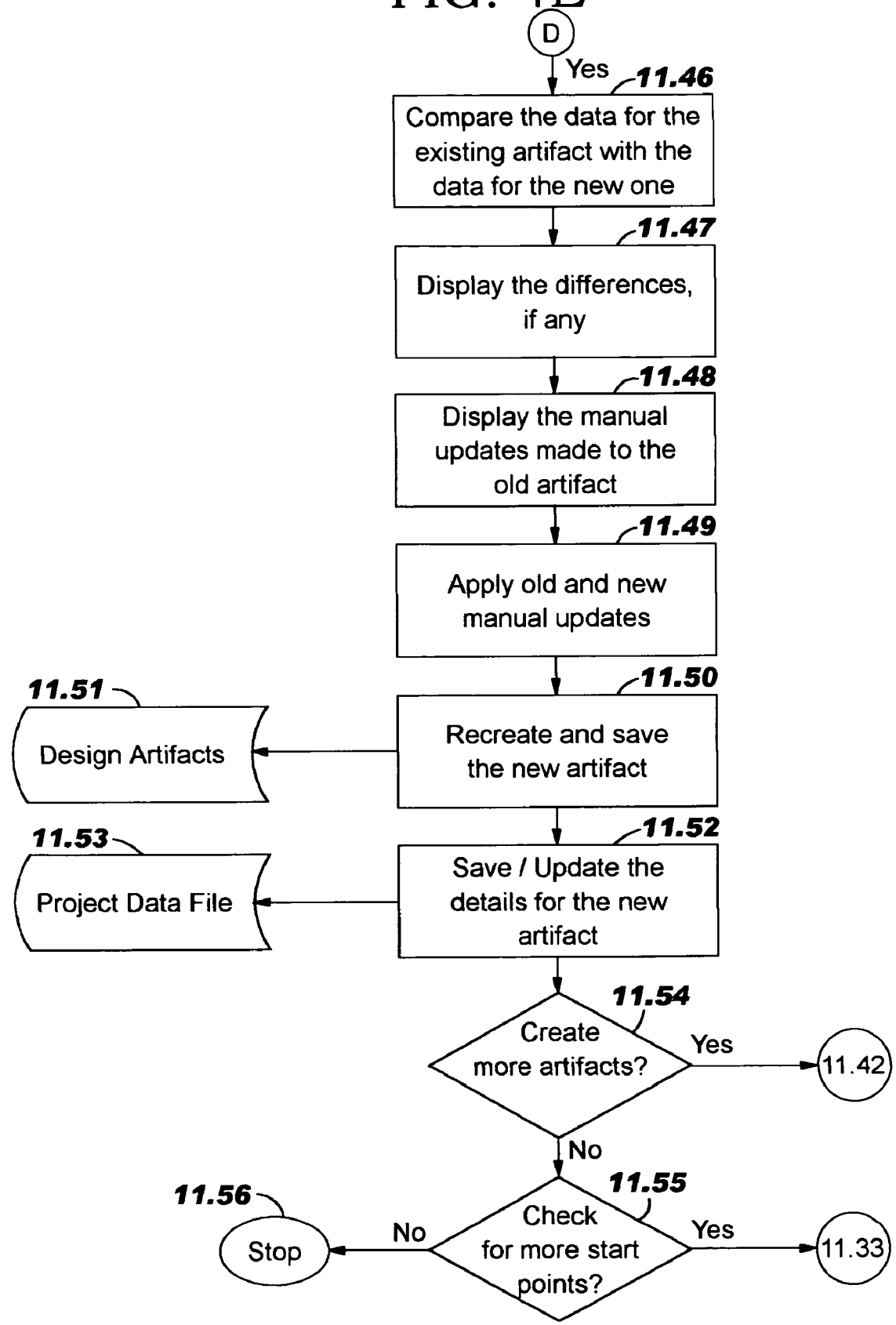

In step 11.49 of FIG. 4E, the tool allows the user to apply the updates made in the previous version of the artifact to the new Call Tree. The user may make additional updates as well. All the updates re-recorded by the tool. The tool also recreates the new artifact and saves it, as shown in step 11.50. If this was an existing artifact it overwrites the file with the new data. The node 11.51 represents the stored Design Artifacts.

In step 11.52, the tool saves the data for the design artifact in the Project Data File 11.53 also identified as 11.44 in FIG.

4D. Existing data for the artifact, if any is overwritten. The user may also specify more design artifacts to be created using the same filtered Call Tree data, as represented by step 11.54. In addition, as shown by step 11.55, the user may specify more start points for the same Symbol Table data generated by parsing the source code files in the project to create new Call Trees and design artifacts. To do this, the process loop back to step 11.33 in FIG. 4C.

Figure 5:
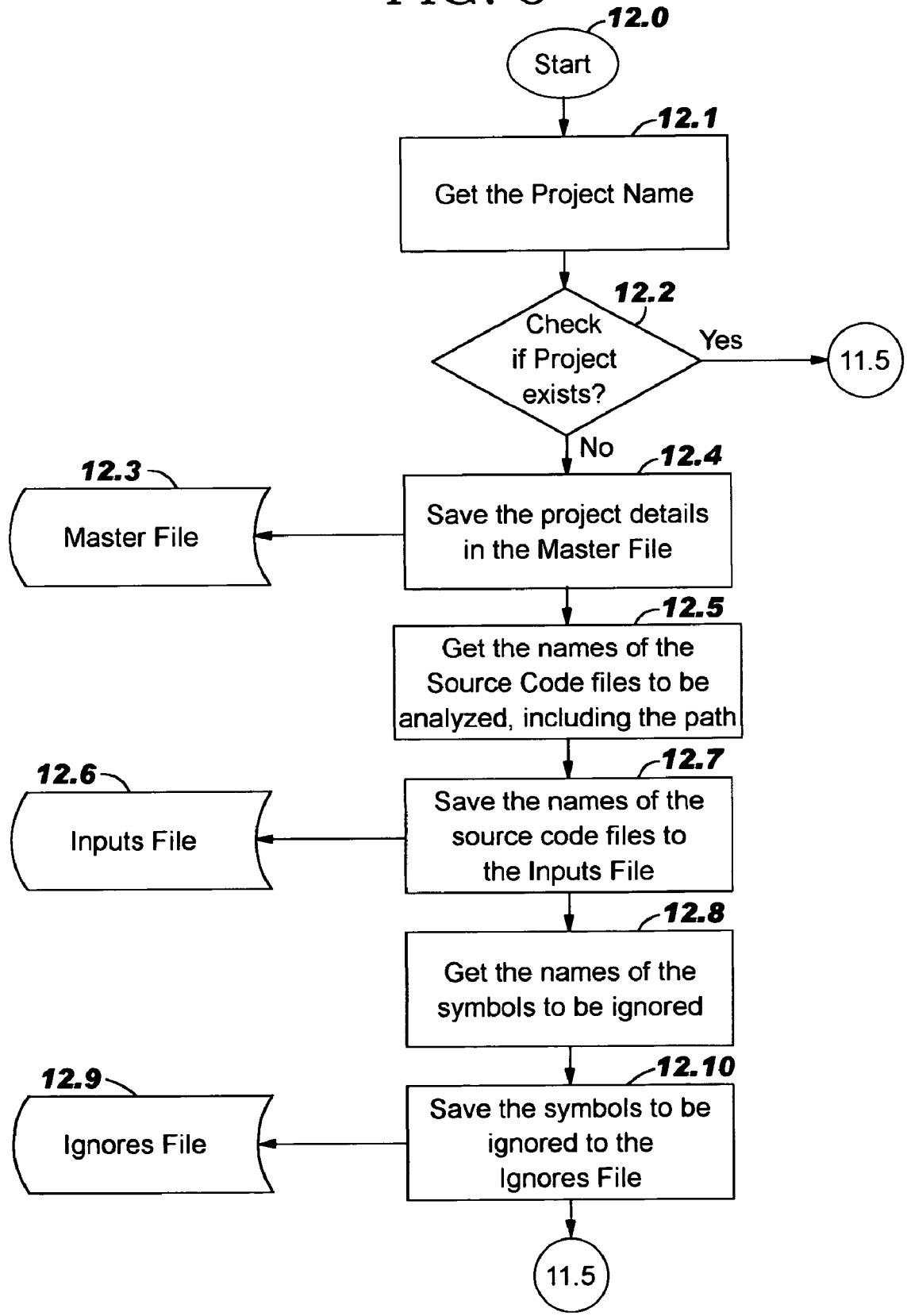
FIG. 5 is a flow chart illustrating a process for creating a new project, as identified in the main process of FIGS. 4A-4E.

FIG. 5 show a process for creating a New Project in the Code Tree Analyzer tool, as shown in step 11.3 in FIG. 4A. A project in the tool is identified by a unique name. The project name, along with the names of the files that hold the data for the project (as described in step 11.1), are saved in Master File 12.3. The name and location of the Master File for the tool is predefined. Any number of projects may be defined in the tool. However, at any one time, only one project may be active. The user may specify the location where the files for a particular project are saved.

In steps 12.1 of FIG. 5, the tool prompts the user for the Project Name. In step 12.2, the tool checks the Master File to determine if the project by that name already exists. If the Project Name exists, the tool prompts the user of such and allows the user to open the existing project. Only if the Project Name does not exist in the Master File may the user proceed to create a new project by that name.

In step 12.4 of FIG. 5, the Project Name along with the names (including the paths) of the associated files for the project are saved in the Master File. In step 12.5, the tool takes as input the complete paths of the source code files that need to be analyzed as part of this project. The node 12.6 in the flow chart represents the Inputs File, as discussed in regard to Node 11.4 in FIG. 4B. In step 12.7, the tool saves the names and paths of the source code files in the Inputs File for the project. The tool then takes as input the names of the classes to be ignored while creating the diagrams and design artifacts, as shown by step 12.8. The node 12.9 in the flow chart represents the Ignores File, as discussed in step 11.37 in FIG. 4D. In step 12.10, the tool saves the classes to be ignored to the Ignores File for the project. This completes the creation of a new project. The other files for the project are created as required during the process of analyzing the source code files and creating the design artifacts.

Figure 6:
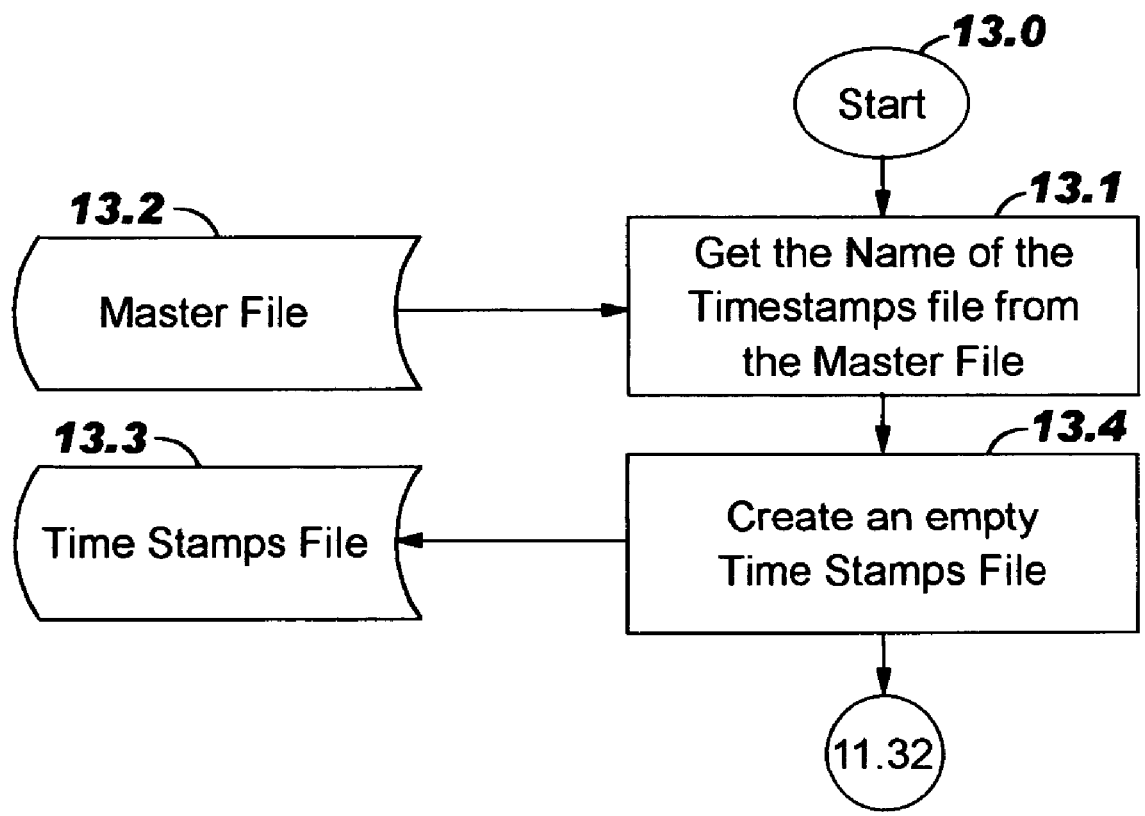
FIG. 6 is a flow chart illustrating a process for creating a new time stamps file, as identified in the main process of FIGS. 4A-4E.

FIG. 6 shows a process for creating a new Timestamps File in the Code Tree Analyzer tool, as shown in step 11.7 in FIG. 4A. The node 13.0 represents the start point of the process. The Timestamps File 13.3, corresponding to File 11.9 in FIG. 4A, stores the time stamps for the source code files from the last run of the tool for the project. This data is used in the next run of the tool for the same project to determine which source files have been modified. A difference in the current time stamp and the one stored in the Timestamps File for a source code file is assumed to be due to modifications made to the source code file.

In step 13.1 of FIG. 6, the tool retrieves the name and the path of the Timestamps file for the project from the Master File 13.2 corresponding to Master File 11.4, as shown in FIG. 4A. In step 13.4, the tool then creates a new Timestamps file as shown at node 13.3 and which corresponds to File 11.9 in FIG. 4A. This file is empty to begin with. The tool writes the time stamps for the various source code files to this file after the source code files have been analyzed.

Figure 7:
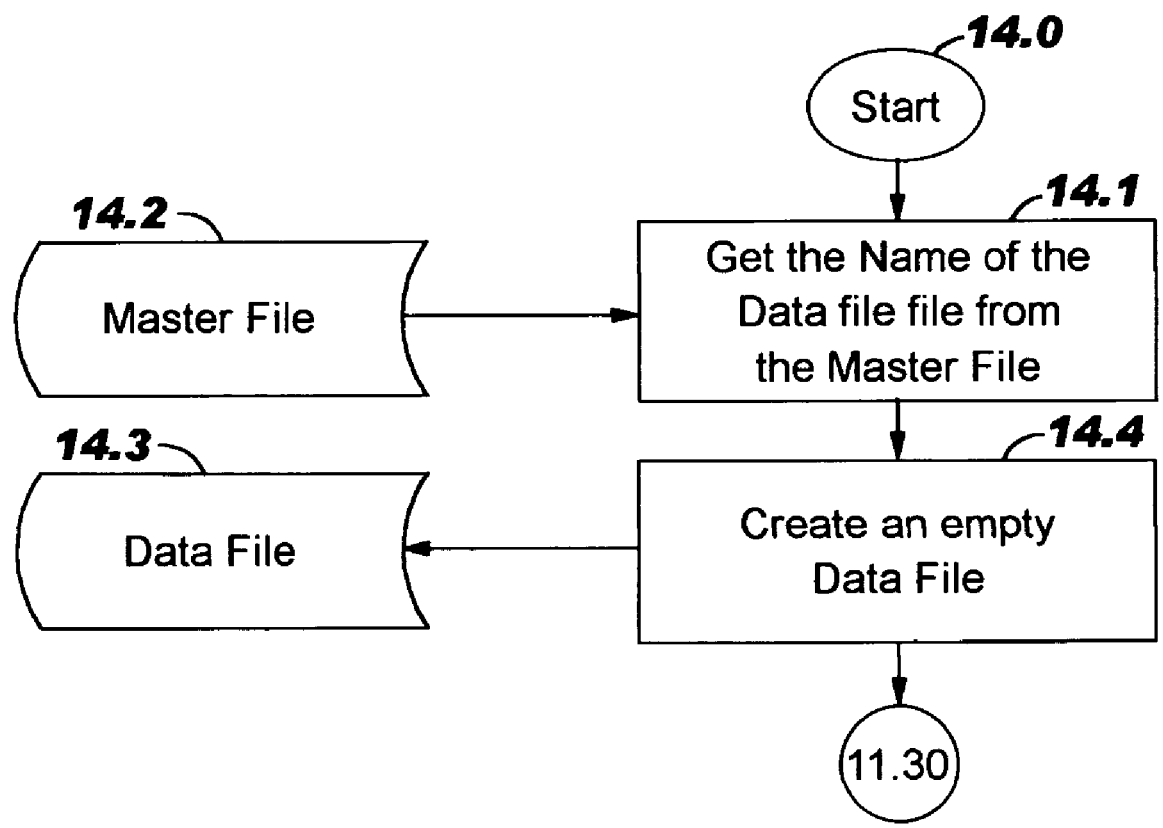
FIG. 7 is a flow chart illustrating a process for creating a new data file, as identified in FIGS. 4A-4E.

FIG. 7 shows a process for creating a new Data Files in the Code Tree Analyzer tool, as referenced by step 11.13 in FIG. 4A. Node 14.0 represents the start point of the flow for the creation of a new Data File. The Data File stores the Symbol Table for the source code files from the last run of the tool for the project. This data is used in the next run of the tool for the same project to minimize the time spent in analyzing files that have not been modified between the runs. For such files the Symbol Table from the previous run is used unchanged.

In step 14.1 of FIG. 7, the tool retrieves the name and the path of the data file for the project from Master File 14.2 corresponding to File 11.4 in FIG. 4A. The tool then creates a new Data File 14.3, as represented by file 11.13 in FIG. 4A. This file is empty to begin with. The tool writes the symbol table for the source code files to this file after the source code files have been analyzed.

FIG. 8 shows a process for resolving the Symbol Table in the Code Tree Analyzer tool, shown as step 11.32 in FIG. 4C. The node 15.0 represents the start point of the process. After the source code files are parsed to extract the method declarations, constructor declarations, variable declarations, method invocations, constructor invocations and code blocks, the Symbol Table is resolved. In this process, the data types for the variables and the return data types of methods are determined. The objective is to determine the names of the classes, the methods invoked on them and the order in which these methods are invoked. Accordingly, the Resolve Symbol Table process replaces those variable names (either explicit or implicit) in the Symbol Table that represent instances of classes with the corresponding class names. In many cases, the tool may not be able to resolve all the invocations as the source code for the class may not have been included as part of the project. Such unresolved method invocations are represented by a special icon called 'unresolved' in the sequence diagram. The user may choose to delete this icon before creating the design artifacts.

In FIG. 8, Step 15.1 of the Resolve Symbol Table process first resolves the method declarations. The return types of the methods and their signatures are determined from the declarations. This is done for the methods and constructors. This is followed by step 15.2 which resolves the method invocations. Typically methods are invoked on variables. This step determines the data type of the variables, such that it is possible to determine the name of the class on which the method is invoked. This is done both for the explicitly declared variables and the implicit ones. For example, the statement "var1.method1( ).method2( )" has two method invocations, one on var1, an explicit variable. The method method2( ) is invoked on the return type of method1( ) and hence is an implicit variable. The tool acts to resolve the classes that correspond to var1 and the implicit variable that represents the return type of method1( ). The tool also keeps track of the constructor invocations in this step.

Next, the method and constructor signatures are resolved as shown by step 15.3 of FIG. 8. This involves determining the data types of each of the parameters that are passed as arguments to the invoked methods and constructors. The order in which the methods are invoked is important from the perspective of a sequence diagram. In step 15.4, the tool resolves the order in which the methods are invoked. This step is particularly important in the case of compound statements that have multiple method invocations in a single statement. Finally, in step 15.5, the symbol table is updated to reflect the resolved method invocations.

In FIG. 9, a process is shown for generating the Call Tree in the Code Tree Analyzer Tool, as represented by step 16.0 in FIG. 4C. The Call Tree is generated based on the resolved Symbol Table. The Call Tree, in turn, forms the basis for the Sequence Diagram. A start point is required to create a call tree. As previously stated, a start point is a combination of a class and a method in the class. Beginning at the start point, the tool recursively determines the methods that are invoked. This results in the creation of a tree structure for the Call Tree.

In step 16.1 of FIG. 9, the tool takes as input a combination of a class and a method in the class that represents the start point of the Call Tree and hence the Sequence Diagram. The tool retrieves the data for the class in the start point from the resolved Symbol Table, as shown in step 16.2. Using the data in the resolved Symbol Table, the tool determines all the methods and constructors that are invoked within the method in the start point. These invocations may either be on the same class or on other classes. This is shown in step 16.3. As shown in step 16.4, the tool loops through each of these invoked methods and constructors in the method of the start point After the tool completes the required loops, it retrieves the data for the corresponding classes from the symbol table, as shown in step 16.5 of FIG. 9. If the classes are not included as part of the project the methods are not considered, as shown in step 16.6. If the classes are part of the project, the methods that are in turn invoked in each of these methods are determined. This is shown by step 16.7. In step 16.8, the process is repeated until none of the classes on which methods are invoked are part of the project. The resultant tree that is generated out of the above recursive steps is the Call Tree for the specified starting point. The tool keeps track of the variable names of an instance of classes as it is passed across the different methods in the call tree. The tool keeps this tree in memory and uses it or a filtered version (generated by removing the classes to be ignored) for generating the Sequence Diagram, which will be described with reference to FIG. 10.

Figure 10:
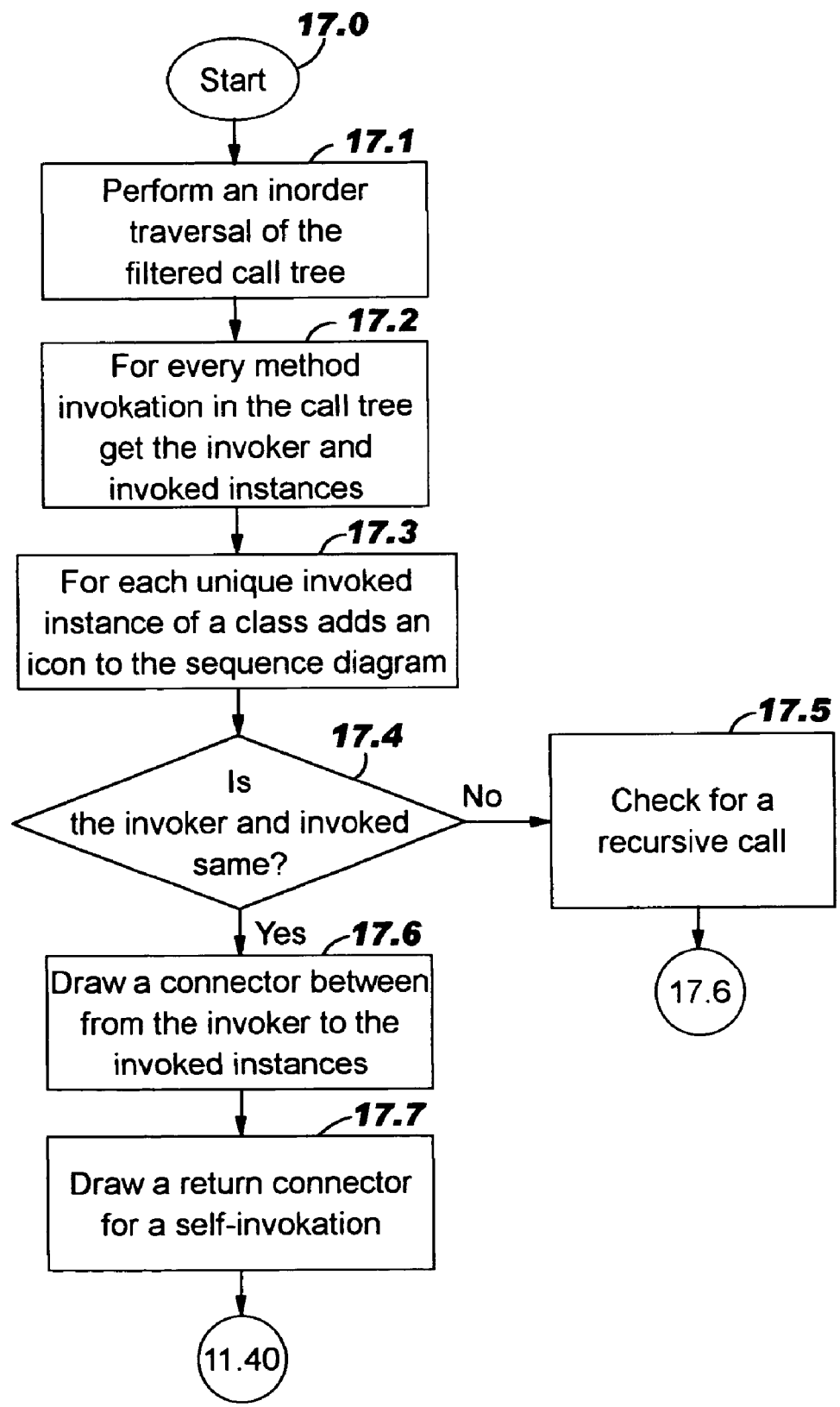
FIG. 10 is a flow chart illustrating a process for rendering a Sequence Diagram from the Call Tree, as identified in FIGS. 4A-4E.

With reference to FIG. 10, there is shown the process for rendering a Sequence Diagram. The node 17.0 represents the start point of the process that creates the Sequence Diagram from the filtered Call Tree. The sequence diagram is drawn by traversing the filtered Call Tree in order as shown in step 17.1. For every method invocation in the filtered Call Tree, the process retrieves the invoker and the invoked instances, as shown in step 17.2. Then, for each unique instance of an invoked class, the tool adds an icon to the Sequence Diagram, as shown in step 17.3.

In step 17.4 of FIG. 10, a check is made to see if the invoker and the invoked instances are the same. If the instances are the same, then a check is made for a recursive call. If the call is recursive, the tool adds a labeled self-connector. If the call is not recursive, the tool adds a simple self-connector. This is shown at step 17.5. If the invoker and the invoked instances are not identical then add a connector from the invoker instance to the invoked instance, as shown at step 17.6. Finally, if a self-invocation has terminated, add a return connector. The above steps are repeated till the entire call tree is traversed. As shown, the process returns to step 11.40 in FIG. 4D.

Figure 11:
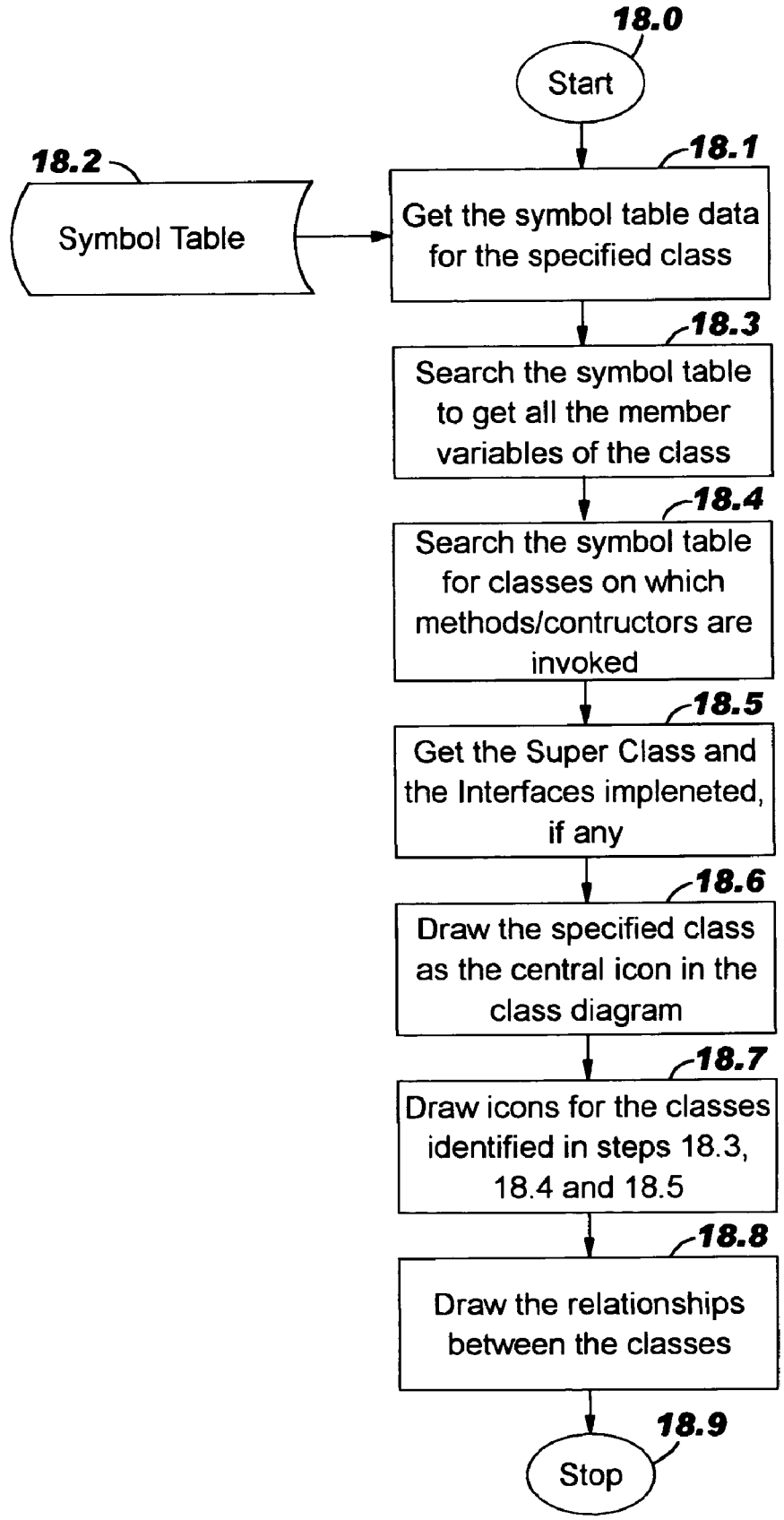
FIG. 11 is a flow chart illustrating a process for rendering a Class Diagram from the Code Tree Analyzer tool.
Figure 13:
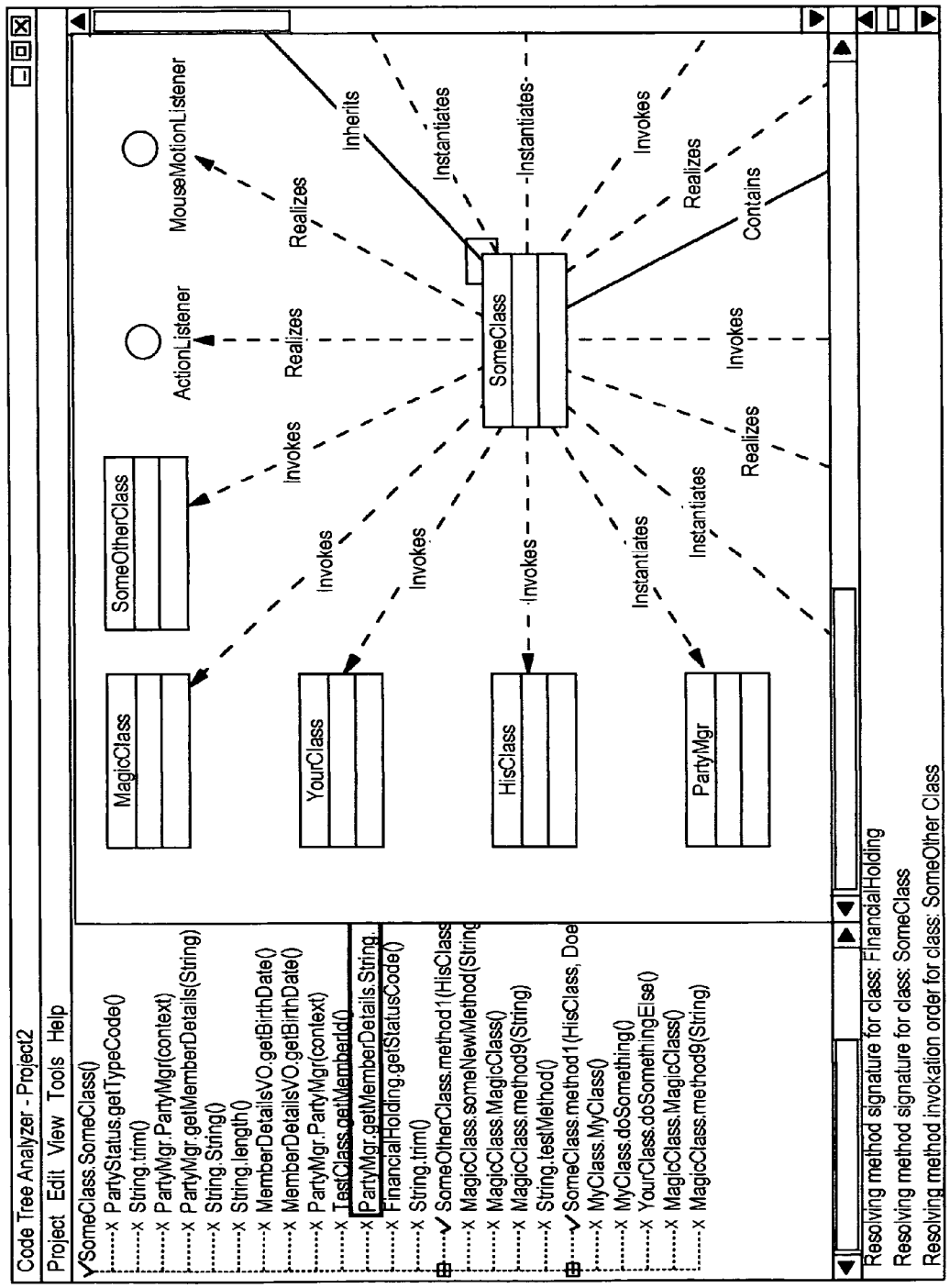
FIG. 13 is a drawing of a screen shot showing an example of a Class Diagram, as rendered by the Code Tree Analyzer tool.

With reference to FIG. 11, there is shown a process for rendering a class diagram from the Code Tree Analyzer tool. The node 18.0 represents the start point of the process that creates the class diagram from the resolved symbol table for the class. The tool is capable to displaying the relationships between a selected class and other classes. The user has to select a class, which is used as the pivot to generate the class diagram. All relationships in the resulting class diagram are displayed between the selected class and other classes that are related to it. Interrelationships between the other classes are not displayed unless the user wishes to explicitly include them. FIG. 13 shows a screen shot of a typical Class Diagram.

To begin the process, the tool retrieves the Symbol Table for the specified class, as shown in step 18.1 of FIG. 11. Then, the tool looks through the Symbol Table for the class to get the member variables in the class, as shown in step 18.3. In step 18.4, the tool looks through the Symbol Table for the classes on which methods or constrictors are invoked. Then, the tool retrieves the super class and the interfaces implemented by the class, if any, as shown in step 18.5. In step 18.6, the specified class is added as the central icon in the class diagram and in step 18.7, the tool adds icons for the classes that were identified in the above steps. FIG. 13 shows a redrawn screen shot of an example of the central icon and related icons.

The tool defines relationships between the classes based on the following rules.

If a class has a member variable in the specified class the relationship is considered to be association.

If a method or a constructor is invoked in the specified class the relationship is considered to be dependency.

The relationship between the specified classes and the interfaces implemented by it is that of realization.

The relationship between the specified classes and its super class is that of generalization.

Also, association takes precedence over dependency. Step 18.8 in FIG. 11 uses these rules to draw the relationships between classes. The process ends at node 18.9. The data generated in the above steps is used to generate design artifacts that contain class diagrams.

Figure 12:
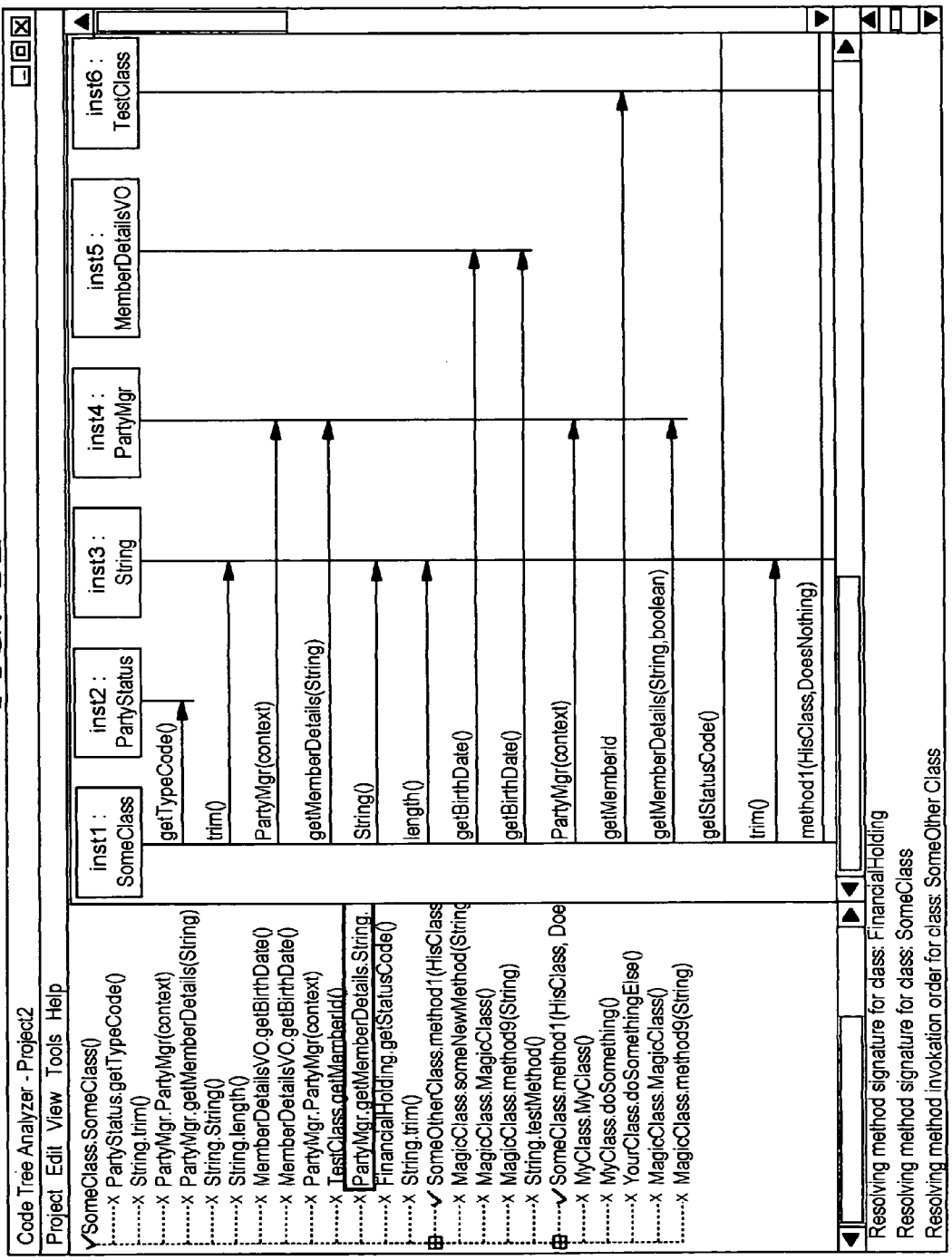
FIG. 12 is a drawing of a screen shot showing an example of a Sequence Diagram, as rendered by the Code Tree Analyzer tool.

FIG. 12 shows a redrawn screen shot of an example of a typical Sequence Diagram. The left panel shows the corresponding Call Tree. A Cross indicates a leaf node. A leaf node represents classes that are not in the project but whose methods have been invoked along a Call Tree path. Similarly, the left panel of FIG. 13 shows the corresponding Call Tree. The purpose of the screen shots, as redrawn in FIGS. 12 and 13, is to demonstrate how the tool may be employed to display the Sequence Diagram and Class Diagram to the user in an interactive mode.

Although description of the process employed by the Code Tree Analyzer tool is based upon the start point being a Class, the tool can, with minimal change, also readily be employed to create Sequence Diagrams with Objects as entities of the start point.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of analyzing static source code of a computer program at static time using a machine to analyze said static source code to determine the effect of updates and changes made to said static source code, comprising:

selecting the static source code to be analyzed;

selecting a class and method in the class based upon a selected class name in said static source code to be analyzed;

generating a call tree as an ordered recursive sequence of all method calls in different classes or their instances that are invoked by said selected method in said selected class;

generating a sequence diagram using said call tree by presenting the method calls as messages in the same order in which they appear in the call tree; and storing said sequence diagram, wherein the stored sequence diagram is used to analyzed the effect of updates and changes made to the static source code of the computer program.

2. The method as set forth in claim 1 including the step of storing the time stamps of said source code.

3. A method of analyzing static source code of a computer program at static time using a machine to analyze said static source code to determine the effect of updates and changes made to said static source code, comprising:
    selecting said static source code for a class name and a method in the class as a start point to begin analyzing;
    parsing said static source code to determine method declarations, constructor declarations, variable declarations, method invocations and constructor invocations;
    resolving all method and constructor declarations to determine return type of methods and their signatures;
    resolving in order all method invocations having compound statements to determine data type of both variables on which said method invocations are invoked and implicit methods invoked on said methods;
    determining classes corresponding to said variables and said implicit methods;
    resolving the order in which said methods are invoked;
    generating a sequence diagram using a call tree using the order in which said methods are invoked; and
    storing said sequence diagram, wherein said sequence diagram is used to analyze the effect of updates and changes made to the static source code of the computer program.

4. The method as set forth in claim 3 wherein classes related to a class used as a start point are arranged around said class used as a start point in radial fashion as a class diagram.

5. The method as set forth in claim 3 including the steps of generating a plurality of different call trees by using respective source code for different class names and different methods in the class as a start point and storing data structure of each of said plurality of different call trees.

6. A method of analyzing static source code of a computer program at static time using a machine to analyze said static source code to determine the effect of updates and changes made to said static source code, comprising:
    selecting the static source code to be analyzed;
    parsing said static source code to determine method declarations, constructor declarations, variable declarations, method invocations and constructor invocations;
    resolving all method and constructor declarations to determine return type of methods and their signatures;
    resolving in order all method invocations having compound statements to determine data type of both variables on which said method invocations are invoked and implicit methods invoked on said methods;
    determining classes corresponding to said variables and said implicit methods;
    resolving the order in which said method invocations are invoked;
    generating different call trees with each call tree of said different call trees generated for a given start point defined by a selected class and method in said selected class in said static source code using the resolved order in which said method invocations are invoked by said method in said selected class and storing data structure of each of said different call trees;
    generating a sequence diagram using each call tree of said different call trees by using the method calls as messages in the same order as they exist in said call tree; and
    updating selected ones of the sequence diagrams generated by said different call trees and saving the updated sequence diagrams as updated work product files.

7. A method of analyzing static source code of a computer program at static time using a machine to analyze said static source code to determine the effect of updates and changes made to said static source code, comprising:
    selecting the static source code to be analyzed;
    selecting a class name and method in the class in said static source code to be analyzed;
    generating a call tree as an ordered recursive sequence of all method calls in different classes or their instances that are invoked by said selected method in said selected class;
    generating a sequence diagram using said call tree by presenting the method calls as messages in the same order in which they appear in the call tree;
    storing said sequence diagram;
    updating said call tree to form new design artifacts;
    storing said new design artifacts; and
    comparing said call tree used to form said new design artifacts with the call tree used to form any previous design artifacts to determine any differences.

8. The method as set forth in claim 7 including the step of updating the call tree used to form said new design artifacts with any of said differences.

9. The method as set forth in claim 8 including the steps of selecting and storing class names to be ignored in creating new design artifacts.

10. A method of analyzing static source code of a computer program at static time using a machine to determine the effect of any updates and changes made to said static source code, comprising:
    selecting the static source code to be analyzed;
    parsing said static source code to determine method declarations, constructor declarations, variable declarations, method invocations and constructor invocations;
    resolving all method and constructor declarations to determine return type of methods and their signatures;
    resolving in order all method invocations having compound statements to determine data type of both variables on which said method invocations are invoked and implicit methods invoked on said methods;
    determining classes corresponding to said variables and said implicit methods;
    resolving the order in which said methods are invoked;
    generating a call tree for a given start point in said static source code using the order in which messages are invoked;
    generating a sequence diagram using said call tree using the method calls as messages in the same order as they exist in said call tree; and
    storing changes manually made to said call tree for applying to any newly generated call tree with the same start point.

11. A method of analyzing static source code of a computer program at static time using a machine to determine the effect of any updates and changes made to said static source code, comprising:
    selecting the static source code to be analyzed;
    parsing said static source code to determine method declarations, constructor declarations, variable declarations, method invocations and constructor invocations;
    resolving all method and constructor declarations to determine return type of methods and their signatures;
    resolving in order all method invocations having compound statements to determine data type of both variables on which said method invocations are invoked and implicit methods invoked on said methods;
    determining classes corresponding to said variables and said implicit methods;
    resolving the order in which said methods are invoked;
    generating a call tree for a given start point in said static source code using the order in which messages are invoked;

generating a sequence diagram using said call tree using the method calls as messages in the same order as they exist in said call tree;

generating a plurality of different call trees and storing data structure of each of said plurality of different call trees; and updating selected ones of the sequence diagrams generated by said plurality of call trees and saving the updated sequence diagrams as updated work product files.

12. The method as set forth in claim 11 including the steps of storing the time stamps of the selected source code.

13. The method as set forth in claim 12 including the step of comparing the latest time stamps of said selected source code to be analyzed with the stored time stamps to determine that source code having a mismatch indicating such source code has changed.

14. The method as set forth in claim 13 including the step of searching through said work products files to determine which files are impacted by source code that has changed.

15. The method as set forth in claim 14 including the further step of updating the impacted work product files.

* * * * *